United States Patent
Houh et al.

(10) Patent No.: US 9,697,230 B2
(45) Date of Patent: Jul. 4, 2017

(54) METHODS AND APPARATUS FOR DYNAMIC PRESENTATION OF ADVERTISING, FACTUAL, AND INFORMATIONAL CONTENT USING ENHANCED METADATA IN SEARCH-DRIVEN MEDIA APPLICATIONS

(75) Inventors: Henry Houh, Lexington, MA (US); Jeffrey Nathan Stern, Belmont, MA (US)

(73) Assignee: CXENSE ASA, Olso (NO)

( * ) Notice: Subject to any disclaimer, the term of this patent is extended or adjusted under 35 U.S.C. 154(b) by 953 days.

(21) Appl. No.: 11/395,608

(22) Filed: Mar. 31, 2006

(65) Prior Publication Data
US 2007/0106760 A1    May 10, 2007

Related U.S. Application Data

(60) Provisional application No. 60/736,124, filed on Nov. 9, 2005.

(51) Int. Cl.
*G06F 15/16*    (2006.01)
*G06F 17/30*    (2006.01)

(52) U.S. Cl.
CPC .. *G06F 17/30247* (2013.01); *G06F 17/30787* (2013.01); *G06F 17/30796* (2013.01); *G06F 17/30817* (2013.01); *G06F 17/30852* (2013.01)

(58) Field of Classification Search
USPC ..... 707/3, 10, 4, 5, 102; 705/50, 51, 57, 59; 725/119, 134, 135, 136, 46, 9, 37
See application file for complete search history.

(56) References Cited

U.S. PATENT DOCUMENTS

| | | | |
|---|---|---|---|
| 5,613,034 A | 3/1997 | Ney et al. | 395/2.6 |
| 5,613,036 A | 3/1997 | Strong | 395/2.52 |
| 6,006,265 A * | 12/1999 | Rangan et al. | 709/226 |
| 6,064,959 A | 5/2000 | Young et al. | |
| 6,081,779 A | 6/2000 | Besling et al. | 704/257 |
| 6,112,172 A | 8/2000 | True et al. | |
| 6,157,912 A | 12/2000 | Kneser et al. | 704/270 |
| 6,345,253 B1 | 2/2002 | Viswanathan | |
| 6,418,431 B1 | 7/2002 | Mahajan et al. | 707/4 |
| 6,484,136 B1 | 11/2002 | Kanevsky et al. | 704/9 |
| 6,501,833 B2 | 12/2002 | Phillips et al. | 379/88.07 |

(Continued)

FOREIGN PATENT DOCUMENTS

EP    1 008 931 A2    6/2000
JP    2004350253    9/2004

(Continued)

OTHER PUBLICATIONS

International Search Report for International Application No. PCT/US2006/043561, Date of Mailing May 9, 2007 (3 pages).

(Continued)

*Primary Examiner* — Brian Whipple
(74) *Attorney, Agent, or Firm* — Tarter Krinsky & Drogin LLP

(57) ABSTRACT

A computerized method and apparatus is disclosed for dynamic presentation of advertising, factual, informational content and combinations thereof. In particular, the advertising content is dynamically presented according to the playback of corresponding segments identified within a media file or stream.

20 Claims, 18 Drawing Sheets

(56) References Cited

U.S. PATENT DOCUMENTS

| | | | |
|---|---|---|---|
| 6,546,427 B1* | 4/2003 | Ehrlich et al. | 709/231 |
| 6,611,803 B1 | 8/2003 | Furuyama et al. | 704/254 |
| 6,671,692 B1 | 12/2003 | Marpe et al. | |
| 6,687,697 B2 | 2/2004 | Collins-Thompson et al. | 707/6 |
| 6,691,123 B1 | 2/2004 | Gulliksen | |
| 6,697,796 B2 | 2/2004 | Kermani | |
| 6,728,673 B2 | 4/2004 | Furuyama et al. | 704/254 |
| 6,728,763 B1 | 4/2004 | Chen | 709/219 |
| 6,738,745 B1 | 5/2004 | Navratil et al. | 704/277 |
| 6,748,375 B1 | 6/2004 | Wong et al. | |
| 6,768,999 B2 | 7/2004 | Prager et al. | |
| 6,785,688 B2 | 8/2004 | Abajian et al. | |
| 6,816,858 B1 | 11/2004 | Coden et al. | 707/5 |
| 6,848,080 B1 | 1/2005 | Lee et al. | 715/533 |
| 6,856,997 B2 | 2/2005 | Lee et al. | |
| 6,859,799 B1 | 2/2005 | Yuen | |
| 6,873,993 B2 | 3/2005 | Charlesworth et al. | |
| 6,877,134 B1 | 4/2005 | Fuller et al. | |
| 6,973,428 B2 | 12/2005 | Boguraev et al. | 704/251 |
| 6,985,861 B2 | 1/2006 | Van Thong et al. | |
| 7,111,009 B1 | 9/2006 | Gupta et al. | |
| 7,120,582 B1 | 10/2006 | Young et al. | |
| 7,177,881 B2 | 2/2007 | Schwesig et al. | |
| 7,222,155 B1* | 5/2007 | Gebhardt et al. | 709/204 |
| 7,260,564 B1* | 8/2007 | Lynn et al. | 707/3 |
| 7,308,487 B1 | 12/2007 | Dansie et al. | |
| 7,337,462 B2* | 2/2008 | Dudkiewicz | G06F 17/30017 348/465 |
| 7,801,910 B2 | 9/2010 | Houh et al. | |
| 2001/0045962 A1 | 11/2001 | Lee et al. | 345/745 |
| 2001/0049826 A1 | 12/2001 | Wilf | |
| 2002/0052925 A1* | 5/2002 | Kim et al. | 709/217 |
| 2002/0069218 A1 | 6/2002 | Sull et al. | |
| 2002/0099695 A1 | 7/2002 | Abajian et al. | |
| 2002/0108112 A1 | 8/2002 | Wallace et al. | |
| 2002/0133398 A1* | 9/2002 | Geller et al. | 705/14 |
| 2002/0143852 A1 | 10/2002 | Guo et al. | 709/201 |
| 2003/0123841 A1* | 7/2003 | Jeannin | 386/46 |
| 2003/0171926 A1 | 9/2003 | Suresh et al. | 704/270.1 |
| 2004/0103433 A1 | 5/2004 | Regeard et al. | 725/53 |
| 2004/0199502 A1 | 10/2004 | Wong et al. | |
| 2004/0199507 A1 | 10/2004 | Tawa, Jr. | 707/7 |
| 2004/0205535 A1 | 10/2004 | Newman et al. | |
| 2005/0033758 A1 | 2/2005 | Baxter | 707/100 |
| 2005/0086692 A1* | 4/2005 | Dudkiewicz et al. | 725/46 |
| 2005/0096910 A1 | 5/2005 | Watson et al. | |
| 2005/0165771 A1 | 7/2005 | Go et al. | |
| 2005/0187965 A1 | 8/2005 | Abajian | |
| 2005/0197724 A1 | 9/2005 | Neogi | 700/94 |
| 2005/0198570 A1* | 9/2005 | Otsuka | G06F 17/30787 715/201 |
| 2005/0216443 A1 | 9/2005 | Morton et al. | |
| 2005/0229118 A1 | 10/2005 | Chiu et al. | |
| 2005/0234875 A1 | 10/2005 | Auerbach et al. | 707/3 |
| 2005/0256867 A1 | 11/2005 | Walther et al. | 707/5 |
| 2006/0015904 A1 | 1/2006 | Marcus | 725/46 |
| 2006/0020662 A1 | 1/2006 | Robinson | 709/203 |
| 2006/0020971 A1 | 1/2006 | Poslinski | 725/44 |
| 2006/0047580 A1 | 3/2006 | Saha | 705/26 |
| 2006/0053156 A1 | 3/2006 | Kaushansky et al. | 707/102 |
| 2006/0265421 A1 | 11/2006 | Ranasinghe et al. | |
| 2007/0005569 A1 | 1/2007 | Hurst-Hiller et al. | |
| 2007/0041522 A1 | 2/2007 | Abella et al. | |
| 2007/0078708 A1 | 4/2007 | Yu et al. | |
| 2007/0100787 A1 | 5/2007 | Lim et al. | |
| 2007/0106646 A1 | 5/2007 | Stern et al. | |
| 2007/0106660 A1 | 5/2007 | Stern et al. | |
| 2007/0106685 A1 | 5/2007 | Houh et al. | |
| 2007/0106693 A1 | 5/2007 | Houh et al. | |
| 2007/0118873 A1 | 5/2007 | Houh et al. | |
| 2007/0183741 A1* | 8/2007 | Lerman | G06F 17/30017 386/249 |
| 2007/0233879 A1* | 10/2007 | Woods | G06Q 30/02 709/227 |
| 2008/0040224 A1* | 2/2008 | Roker | G06Q 30/02 705/14.66 |
| 2009/0222442 A1 | 9/2009 | Houh et al. | |

FOREIGN PATENT DOCUMENTS

| | | | |
|---|---|---|---|
| KR | 2002024865 A1 | 4/2002 | |
| WO | WO02/11123 A2 | 2/2002 | G10L 17/00 |
| WO | WO 2005/004442 A1 | 1/2005 | |
| WO | 2007/056485 A2 | 5/2007 | |
| WO | 2007/056531 A1 | 5/2007 | |
| WO | 2007/056532 A1 | 5/2007 | |
| WO | 2007/056534 A1 | 5/2007 | |
| WO | 2007/056535 A2 | 5/2007 | |

OTHER PUBLICATIONS

Van Thong, et al., "SPEECHBOT: An Experimental Speech-Based Search Engine for Multimedia Content in the Web," Cambridge Research Laboratory, Technical Report Series, 19 pages, Jul. 2001.
International Search Report for PCT/US2006/043683 dated Aug. 2, 2007 (3 pages).
Written Opinion of the International Searching Authority for PCT/US2006/043683 dated Aug. 2, 2007 (6 pages).
Stuart, Anne, "SpeechBot: A Search Engine for Sound," http://www.hpl.hp.com/cgi-bn/pf.cgi, last visited on Nov. 6, 2006 (4 pages).
"BBN Audio Indexer," BBN Technologies, A Verizon Company, last visited on Nov. 6, 2006, http://web.archive.org/web/20020214165834/http://www.bbn.com/speech/audioindexer.html, approximately Feb. 14, 2002, as indicated on Wayback Machine website at http://web.archive.org/web/*/http://www.bbn.com/speech/audioindexer.html, last visited on Nov. 6, 2006 (3 pages).
International Search Report for International Application No. PCT/US2006/043680, date of mailing Apr. 27, 2007 (3 pages).
International Search Report for International Application No. PCT/US2006/043682, date of mailing Mar. 30, 2007, including Written Opinion of the International Searching Authority (10 pages total).
International Search Report for PCT/US2006/043561, dated Apr. 17, 2007 (3 pages).
Lindblad, Christopher J., et al., "ViewStation Applications: Implications for Network Traffic," IEEE Journal of Selected Areas in Communications, 1995.
Little, T.D.C., et al., "A Digital On-Demand Video Service Supporting Content-Based Queries," International Multimedia Conference, Proceedings of the First ACM International Conference on Multimedia, Anaheim, CA, Sep. 1993, 10 pages.
Van Thong, Jean-Manuel "SpeechBot: a Speech Recognition based Audio Indexing System for the Web", 2000, 10 pages, available on internet at: http://apotheca.hpl.hp.com/ftp/pub/compaq/CRL/publications/jmvt/speechbotRIAO2000.pdf.
International Preliminary Report on Patentability received for PCT Patent Application No. PCT/US2006/043682, issued on May 14, 2008, 6 pages.
International Preliminary Report on Patentability received for PCT Patent Application No. PCT/US2006/043683, issued on May 14, 2008, 6 pages.
Bregler et al.,"Video Rewrite: Driving Visual Speech with Audio", ACM SIGGRAPH, 1997, pp. 1-8.
International Preliminary Report on Patentability received for PCT patent Application No. PCT/US2006/043561, issued on May 14, 2008, 6 pages.
International Search Report and Written Opinion received for PCT Patent Application No. PCT/US2006/043679, mailed on Apr. 27, 2007, 7 pages.
International Preliminary Report on Patentability received for PCT Patent Application No. PCT/US2006/043679, issued on May 14, 2008, 6 pages.
International Preliminary Report on Patentability received for PCT Patent Application No. PCT/US2006/043680, issued on May 14, 2008, 6 pages.

* cited by examiner

| SEG ID | START | END | AD | FACT | INFO |
|---|---|---|---|---|---|
| 902a | $T_0$ | $T_1$ | $AD_0$ | $FACT_0$ | $INFO_0$ |
| ... | | | | | |
| 902j | $T_9$ | $T_{10}$ | $AD_9$ | $FACT_9$ | $INFO_9$ |
| 902k | $T_{10}$ | $T_{11}$ | $AD_{10}$ | $FACT_{10}$ | $INFO_{10}$ |
| ... | | | | | |

FIG. 7C

METHODS AND APPARATUS FOR DYNAMIC PRESENTATION OF ADVERTISING, FACTUAL, AND INFORMATIONAL CONTENT USING ENHANCED METADATA IN SEARCH-DRIVEN MEDIA APPLICATIONS

RELATED APPLICATIONS

This application claims the benefit of U.S. Provisional Application No. 60/736,124, filed on Nov. 9, 2005. The entire teachings of the above application are incorporated herein by reference.

FIELD OF THE INVENTION

Aspects of the invention relate to methods and apparatus for generating and using enhanced metadata in search-driven applications.

BACKGROUND OF THE INVENTION

As the World Wide Web has emerged as a major research tool across all fields of study, the concept of metadata has become a crucial topic. Metadata, which can be broadly defined as "data about data," refers to the searchable definitions used to locate information. This issue is particularly relevant to searches on the Web, where metatags may determine the ease with which a particular Web site is located by searchers. Metadata that are embedded with content is called embedded metadata. A data repository typically stores the metadata detached from the data.

Results obtained from search engine queries are limited to metadata information stored in a data repository, referred to as an index. With respect to media files or streams, the metadata information that describes the audio content or the video content is typically limited to information provided by the content publisher. For example, the metadata information associated with audio/video podcasts generally consists of a URL link to the podcast, title, and a brief summary of its content. If this limited information fails to satisfy a search query, the search engine is not likely to provide the corresponding audio/video podcast as a search result even if the actual content of the audio/video podcast satisfies the query.

SUMMARY OF THE INVENTION

According to one aspect, the invention features an automated method and apparatus for generating metadata enhanced for audio, video or both ("audio/video") search-driven applications. The apparatus includes a media indexer that obtains an media file or stream ("media file/stream"), applies one or more automated media processing techniques to the media file/stream, combines the results of the media processing into metadata enhanced for audio/video search, and stores the enhanced metadata in a searchable index or other data repository. The media file/stream can be an audio/video podcast, for example. By generating or otherwise obtaining such enhanced metadata that identifies content segments and corresponding timing information from the underlying media content, a number of for audio/video search-driven applications can be implemented as described herein. The term "media" as referred to herein includes audio, video or both.

According to another aspect, the invention features a computerized method and apparatus for dynamic presentation of advertising, factual, informational content and combinations thereof (hereinafter referred to as "advertising content" generally). In particular, the advertising content is dynamically presented according to the playback of corresponding segments identified within a media file or stream.

According to one embodiment, the method and apparatus involves a client receiving media content and corresponding metadata for playback. The metadata identifies content segments and corresponding timing information derived from the media content using one or more media processing techniques. During playback of the media content, the client identifies the content segment in playback by comparing a playback status with the timing information from the metadata. Once the content segment is identified, the client presents a set of factual, informational, or advertising content associated with the content segment in playback.

In such embodiments, the method and apparatus can receive media content and corresponding metadata for playback, such that the metadata identifies content segments and corresponding timing information derived from the media content using one or more media processing techniques. During playback of the media content, the content segment in playback can be identified by comparing a playback status with the timing information from the metadata. Once the content segment is identified, a set of factual, informational, or advertising content associated with the content segment in playback is presented.

In such embodiment, the method and apparatus can provide an identification of the content segment in playback to a server; and receive the set of factual, informational, or advertising content associated with the content segment in playback from the server.

In such embodiments, the method and apparatus can receive a plurality of factual, informational, or advertising content from a server, provide an identification of the content segment in playback to the server, and receive a set of instructions or data from the server identifying the set of factual, informational, or advertising content from among the plurality of factual, informational, or advertising content for presentation.

In such embodiments, the method and apparatus can obtain a data map that associates a corresponding set of factual, informational, or advertising content with each of the content segments of the media content identified in the metadata. During playback of the media content, the content segment in playback is identified by comparing the playback status with the timing information from the metadata. Using the data map, the corresponding set of factual, informational, or advertising content associated with the content segment in playback is determined and presented concurrently or relative to the content segment in playback.

In such embodiment, the content segments can include word segments, audio speech segments, video segments and marker segments. For example, the content segments of the media content can correspond to a word, a phrase, a sentence, a paragraph, a story, or a topic. The content segments of the media content can also correspond to a speaker identified during the one or more media processing techniques.

According to another embodiment, the method and apparatus involves a server receiving obtaining metadata corresponding to media content in playback at a client. The metadata identifies content segments and corresponding timing information derived from the media content using one or more media processing techniques. During playback of the media content, the server receives a playback status of the media content from the client. The server identifies the current content segment in playback by comparing the playback status with the timing information from the metadata and then directs the client to present a set of factual, informational, or advertising content associated with the content segment in playback.

In such embodiments, the method and apparatus can obtain a data map that associates a corresponding set of factual, informational, or advertising content with each of the content segments of the media content identified in the metadata; and use the data map to determine the corresponding set of factual, informational, or advertising content associated with the content segment in playback.

In such embodiments, the method and apparatus can direct the client to present the set by transmitting the set of factual, informational, or advertising content associated with the content segment in playback to the client for presentation.

In such embodiments, the method and apparatus can transmit a plurality of factual, informational, or advertising content from the server, and, subsequent to identifying the content segment in playback, direct the client to present the set of factual, informational or advertising content by providing the client with a set of instructions or data identifying the set from among the plurality of factual, informational, or advertising content for presentation.

In such embodiments, the content segments can include word segments, audio speech segments, video segments and marker segments. For example, the content segments of the media content can correspond to a word, a phrase, a sentence, a paragraph, a story, or a topic. The content segments of the media content can also correspond to a speaker identified during the one or more media processing techniques.

BRIEF DESCRIPTIONS OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIGS. 7A-7C are diagrams that illustrate dynamic presentation of advertising content according to the playback of corresponding segments.

DETAILED DESCRIPTION

Generation of Enhanced Metadata for Audio/Video

The invention features an automated method and apparatus for generating metadata enhanced for audio/video search-driven applications. The apparatus includes a media indexer that obtains an media file/stream (e.g., audio/video podcasts), applies one or more automated media processing techniques to the media file/stream, combines the results of the media processing into metadata enhanced for audio/video search, and stores the enhanced metadata in a searchable index or other data repository.

Figure 1A:
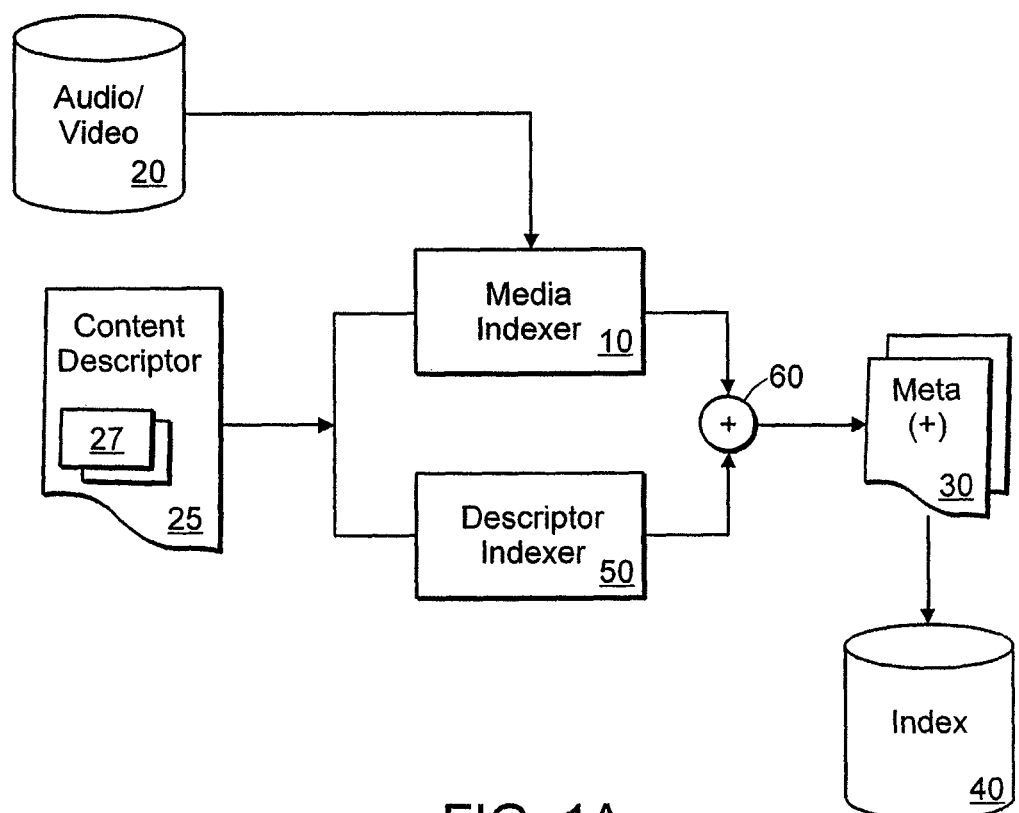
FIG. 1A is a diagram illustrating an apparatus and method for generating metadata enhanced for audio/video search-driven applications.

FIG. 1A is a diagram illustrating an apparatus and method for generating metadata enhanced for audio/video search-driven applications. As shown, the media indexer 10 cooperates with a descriptor indexer 50 to generate the enhanced metadata 30. A content descriptor 25 is received and processed by both the media indexer 10 and the descriptor indexer 50. For example, if the content descriptor 25 is a Really Simple Syndication (RSS) document, the metadata 27 corresponding to one or more audio/video podcasts includes a title, summary, and location (e.g., URL link) for each podcast. The descriptor indexer 50 extracts the descriptor metadata 27 from the text and embedded metatags of the content descriptor 25 and outputs it to a combiner 60. The content descriptor 25 can also be a simple web page link to a media file. The link can contain information in the text of the link that describes the file and can also include attributes in the HTML that describe the target media file.

In parallel, the media indexer 10 reads the metadata 27 from the content descriptor 25 and downloads the audio/video podcast 20 from the identified location. The media indexer 10 applies one or more automated media processing techniques to the downloaded podcast and outputs the combined results to the combiner 60. At the combiner 60, the metadata information from the media indexer 10 and the descriptor indexer 50 are combined in a predetermined format to form the enhanced metadata 30. The enhanced metadata 30 is then stored in the index 40 accessible to search-driven applications such as those disclosed herein.

In other embodiments, the descriptor indexer 50 is optional and the enhanced metadata is generated by the media indexer 10.

Figure 1B:
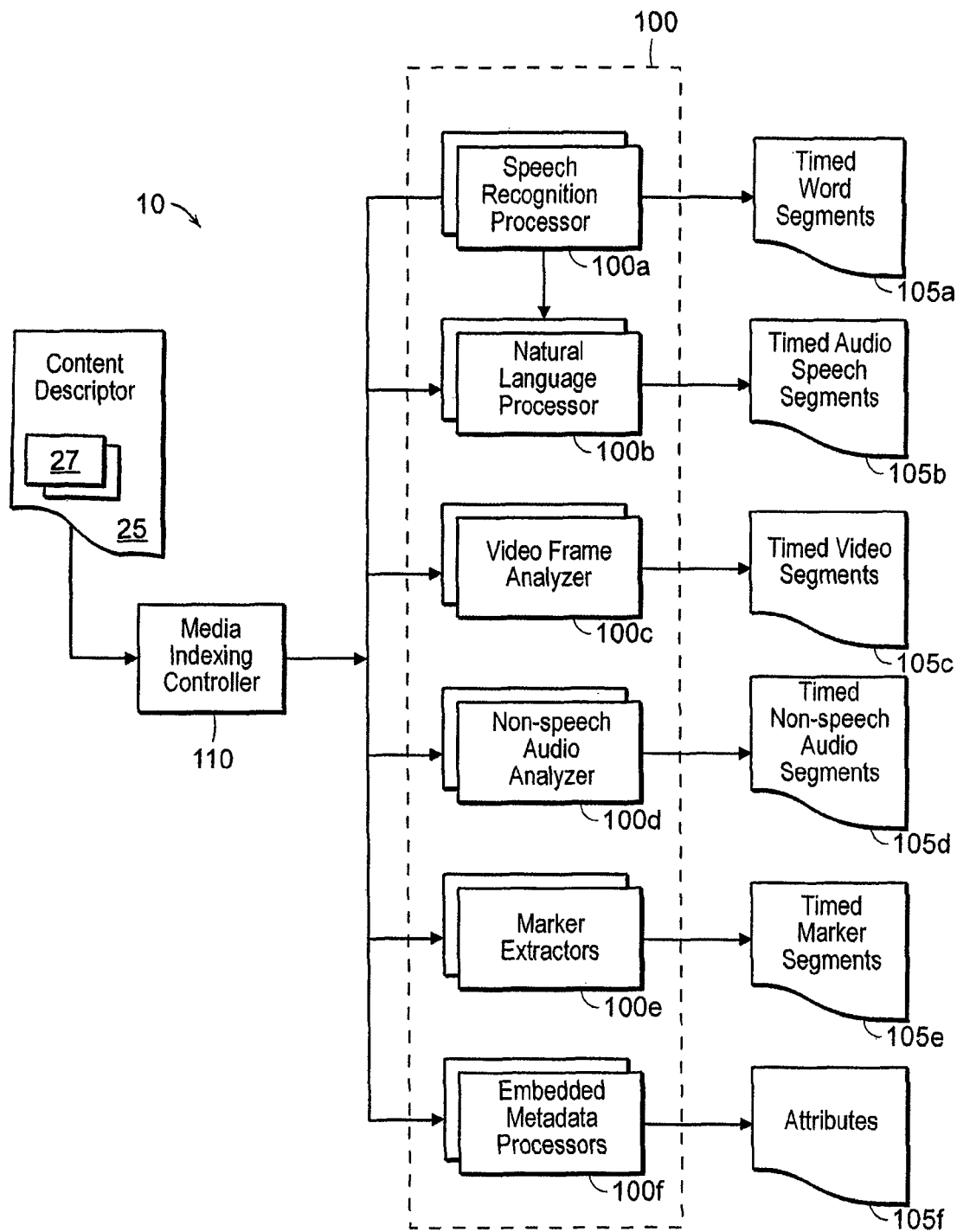
FIG. 1B is a diagram illustrating an example of a media indexer.

FIG. 1B is a diagram illustrating an example of a media indexer. As shown, the media indexer 10 includes a bank of media processors 100 that are managed by a media indexing controller 110. The media indexing controller 110 and each of the media processors 100 can be implemented, for example, using a suitably programmed or dedicated processor (e.g., a microprocessor or microcontroller), hardwired logic, Application Specific Integrated Circuit (ASIC), and a Programmable Logic Device (PLD) (e.g., Field Programmable Gate Array (FPGA)).

A content descriptor 25 is fed into the media indexing controller 110, which allocates one or more appropriate media processors 100*a* . . . 100*n* to process the media files/streams 20 identified in the metadata 27. Each of the assigned media processors 100 obtains the media file/stream (e.g., audio/video podcast) and applies a predefined set of audio or video processing routines to derive a portion of the enhanced metadata from the media content.

Examples of known media processors 100 include speech recognition processors 100*a*, natural language processors 100*b*, video frame analyzers 100*c*, non-speech audio analyzers 100*d*, marker extractors 100*e* and embedded metadata processors 100*f*. Other media processors known to those skilled in the art of audio and video analysis can also be implemented within the media indexer. The results of such media processing define timing boundaries of a number of content segment within a media file/stream, including timed word segments 105*a*, timed audio speech segments 105*b*, timed video segments 105*c*, timed non-speech audio segments 105*d*, timed marker segments 105*e*, as well as miscellaneous content attributes 105*f*, for example.

Figure 2:
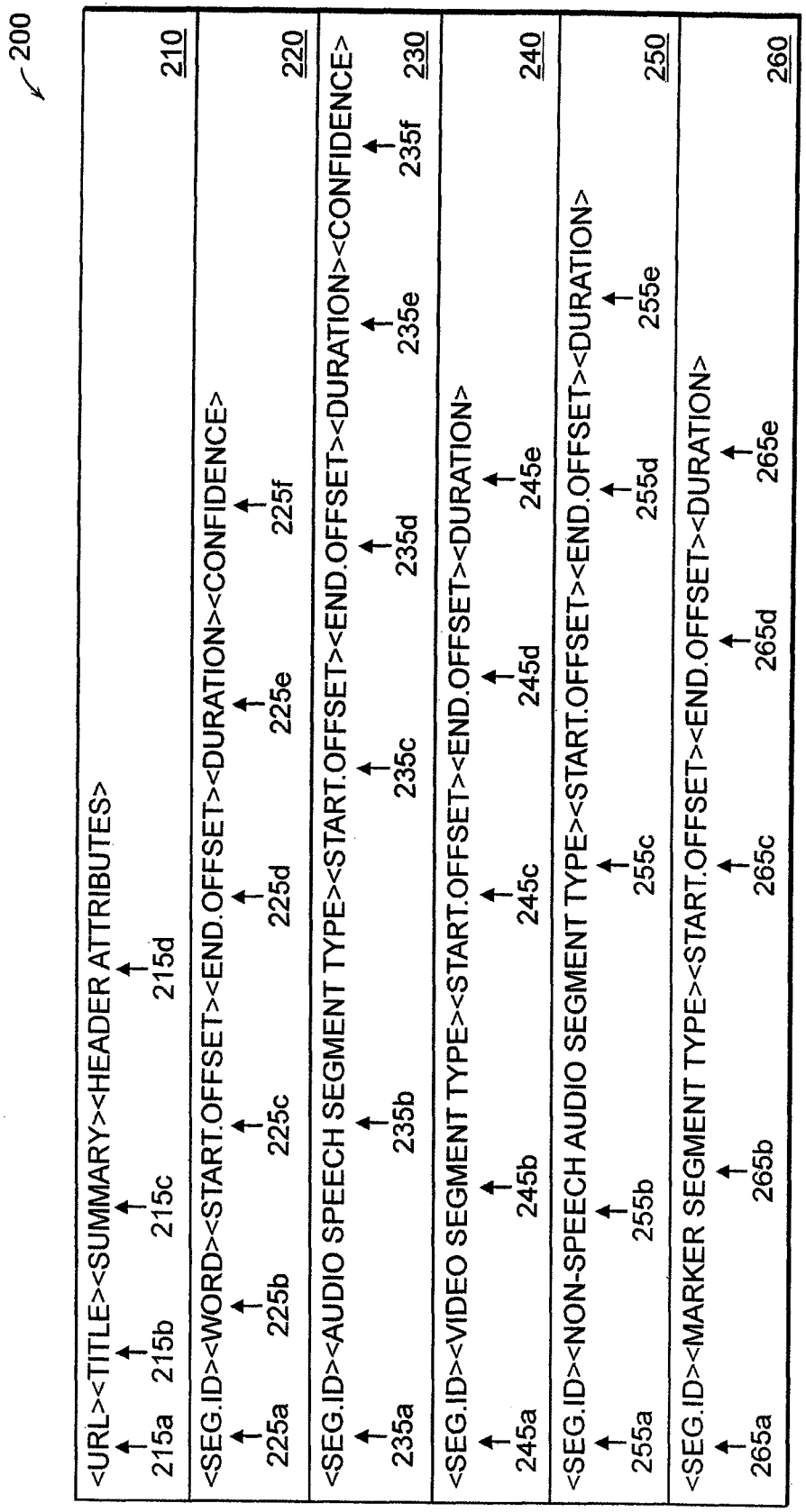
FIG. 2 is a diagram illustrating an example of metadata enhanced for audio/video search-driven applications.

FIG. 2 is a diagram illustrating an example of metadata enhanced for audio/video search-driven applications. As shown, the enhanced metadata 200 include metadata 210 corresponding to the underlying media content generally. For example, where the underlying media content is an audio/video podcast, metadata 210 can include a URL 215*a*, title 215*b*, summary 215*c*, and miscellaneous content attributes 215*d*. Such information can be obtained from a content descriptor by the descriptor indexer 50. An example of a content descriptor is a Really Simple Syndication (RSS) document that is descriptive of one or more audio/video podcasts. Alternatively, such information can be extracted by an embedded metadata processor 100*f* from header fields embedded within the media file/stream according to a predetermined format.

The enhanced metadata 200 further identifies individual segments of audio/video content and timing information that defines the boundaries of each segment within the media file/stream. For example, in FIG. 2, the enhanced metadata 200 includes metadata that identifies a number of possible content segments within a typical media file/stream, namely word segments, audio speech segments, video segments, non-speech audio segments, and/or marker segments, for example.

The metadata 220 includes descriptive parameters for each of the timed word segments 225, including a segment identifier 225*a*, the text of an individual word 225*b*, timing information defining the boundaries of that content segment (i.e., start offset 225*c*, end offset 225*d*, and/or duration 225*e*), and optionally a confidence score 225*f*. The segment identifier 225*a* uniquely identifies each word segment amongst the content segments identified within the metadata 200. The text of the word segment 225*b* can be determined using a speech recognition processor 100*a* or parsed from closed caption data included with the media file/stream. The start offset 225*c* is an offset for indexing into the audio/video content to the beginning of the content segment. The end offset 225*d* is an offset for indexing into the audio/video content to the end of the content segment. The duration 225*e* indicates the duration of the content segment. The start offset, end offset and duration can each be represented as a timestamp, frame number or value corresponding to any other indexing scheme known to those skilled in the art. The confidence score 225*f* is a relative ranking (typically between 0 and 1) provided by the speech recognition processor 100*a* as to the accuracy of the recognized word.

The metadata 230 includes descriptive parameters for each of the timed audio speech segments 235, including a segment identifier 235*a*, an audio speech segment type 235*b*, timing information defining the boundaries of the content segment (e.g., start offset 235*c*, end offset 235*d*, and/or duration 235*e*), and optionally a confidence score 235*f*. The segment identifier 235*a* uniquely identifies each audio speech segment amongst the content segments identified within the metadata 200. The audio speech segment type 235*b* can be a numeric value or string that indicates whether the content segment includes audio corresponding to a phrase, a sentence, a paragraph, story or topic, particular gender, and/or an identified speaker. The audio speech segment type 235*b* and the corresponding timing information can be obtained using a natural language processor 100*b* capable of processing the timed word segments from the speech recognition processors 100*a* and/or the media file/stream 20 itself. The start offset 235*c* is an offset for indexing into the audio/video content to the beginning of the content segment. The end offset 235*d* is an offset for indexing into the audio/video content to the end of the content segment. The duration 235*e* indicates the duration of the content segment. The start offset, end offset and duration can each be represented as a timestamp, frame number or value corresponding to any other indexing scheme known to those skilled in the art. The confidence score 235*f* can be in the form of a statistical value (e.g., average, mean, variance, etc.) calculated from the individual confidence scores 225*f* of the individual word segments.

The metadata 240 includes descriptive parameters for each of the timed video segments 245, including a segment identifier 225*a*, a video segment type 245*b*, and timing information defining the boundaries of the content segment (e.g., start offset 245*c*, end offset 245*d*, and/or duration 245*e*). The segment identifier 245*a* uniquely identifies each video segment amongst the content segments identified within the metadata 200. The video segment type 245*b* can be a numeric value or string that indicates whether the content segment corresponds to video of an individual scene, watermark, recognized object, recognized face, or overlay text. The video segment type 245*b* and the corresponding timing information can be obtained using a video frame analyzer 100*c* capable of applying one or more image processing techniques. The start offset 235*c* is an offset for indexing into the audio/video content to the beginning of the content segment. The end offset 235*d* is an offset for indexing into the audio/video content to the end of the content segment. The duration 235*e* indicates the duration of the content segment. The start offset, end offset and duration can each be represented as a timestamp, frame number or value corresponding to any other indexing scheme known to those skilled in the art.

The metadata 250 includes descriptive parameters for each of the timed non-speech audio segments 255 include a segment identifier 225a, a non-speech audio segment type 255b, and timing information defining the boundaries of the content segment (e.g., start offset 255c, end offset 255d, and/or duration 255e). The segment identifier 255a uniquely identifies each non-speech audio segment amongst the content segments identified within the metadata 200. The audio segment type 235b can be a numeric value or string that indicates whether the content segment corresponds to audio of non-speech sounds, audio associated with a speaker emotion, audio within a range of volume levels, or sound gaps, for example. The non-speech audio segment type 255b and the corresponding timing information can be obtained using a non-speech audio analyzer 100d. The start offset 255c is an offset for indexing into the audio/video content to the beginning of the content segment. The end offset 255d is an offset for indexing into the audio/video content to the end of the content segment. The duration 255e indicates the duration of the content segment. The start offset, end offset and duration can each be represented as a timestamp, frame number or value corresponding to any other indexing scheme known to those skilled in the art.

The metadata 260 includes descriptive parameters for each of the timed marker segments 265, including a segment identifier 265a, a marker segment type 265b, timing information defining the boundaries of the content segment (e.g., start offset 265c, end offset 265d, and/or duration 265e). The segment identifier 265a uniquely identifies each video segment amongst the content segments identified within the metadata 200. The marker segment type 265b can be a numeric value or string that can indicates that the content segment corresponds to a predefined chapter or other marker within the media content (e.g., audio/video podcast). The marker segment type 265b and the corresponding timing information can be obtained using a marker extractor 100e to obtain metadata in the form of markers (e.g., chapters) that are embedded within the media content in a manner known to those skilled in the art.

By generating or otherwise obtaining such enhanced metadata that identifies content segments and corresponding timing information from the underlying media content, a number of for audio/video search-driven applications can be implemented as described herein.

Audio/Video Search Snippets

According to another aspect, the invention features a computerized method and apparatus for generating and presenting search snippets that enable user-directed navigation of the underlying audio/video content. The method involves obtaining metadata associated with discrete media content that satisfies a search query. The metadata identifies a number of content segments and corresponding timing information derived from the underlying media content using one or more automated media processing techniques. Using the timing information identified in the metadata, a search result or "snippet" can be generated that enables a user to arbitrarily select and commence playback of the underlying media content at any of the individual content segments.

Figure 3:
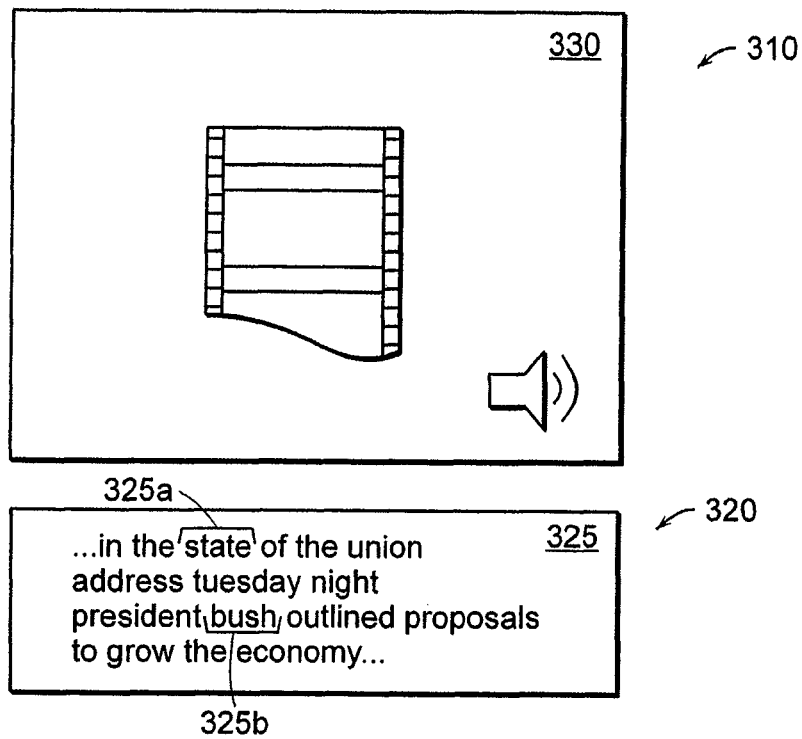
FIG. 3 is a diagram illustrating an example of a search snippet that enables user-directed navigation of underlying media content.

FIG. 3 is a diagram illustrating an example of a search snippet that enables user-directed navigation of underlying media content. The search snippet 310 includes a text area 320 displaying the text 325 of the words spoken during one or more content segments of the underlying media content. A media player 330 capable of audio/video playback is embedded within the search snippet or alternatively executed in a separate window.

The text 325 for each word in the text area 320 is preferably mapped to a start offset of a corresponding word segment identified in the enhanced metadata. For example, an object (e.g. SPAN object) can be defined for each of the displayed words in the text area 320. The object defines a start offset of the word segment and an event handler. Each start offset can be a timestamp or other indexing value that identifies the start of the corresponding word segment within the media content. Alternatively, the text 325 for a group of words can be mapped to the start offset of a common content segment that contains all of those words. Such content segments can include a audio speech segment, a video segment, or a marker segment, for example, as identified in the enhanced metadata of FIG. 2.

Playback of the underlying media content occurs in response to the user selection of a word and begins at the start offset corresponding to the content segment mapped to the selected word or group of words. User selection can be facilitated, for example, by directing a graphical pointer over the text area 320 using a pointing device and actuating the pointing device once the pointer is positioned over the text 325 of a desired word. In response, the object event handler provides the media player 330 with a set of input parameters, including a link to the media file/stream and the corresponding start offset, and directs the player 330 to commence or otherwise continue playback of the underlying media content at the input start offset.

For example, referring to FIG. 3, if a user clicks on the word 325a, the media player 330 begins to plays back the media content at the audio/video segment starting with "state of the union address . . ." Likewise, if the user clicks on the word 325b, the media player 330 commences playback of the audio/video segment starting with "bush outlined . . ."

An advantage of this aspect of the invention is that a user can read the text of the underlying audio/video content displayed by the search snippet and then actively "jump to" a desired segment of the media content for audio/video playback without having to listen to or view the entire media stream.

Figure 4:
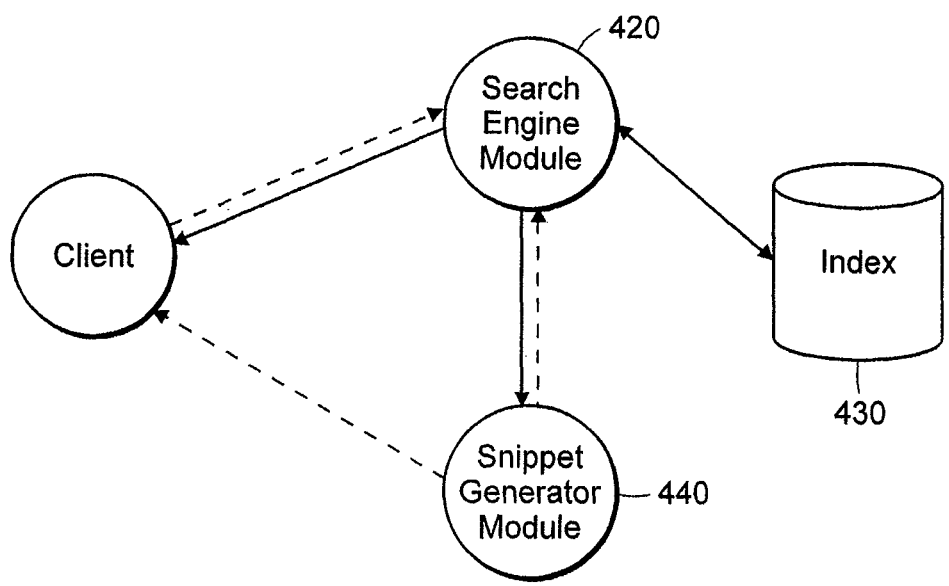
FIGS. 4 and 5 are diagrams illustrating a computerized method and apparatus for generating search snippets that enable user navigation of the underlying media content.
Figure 5:
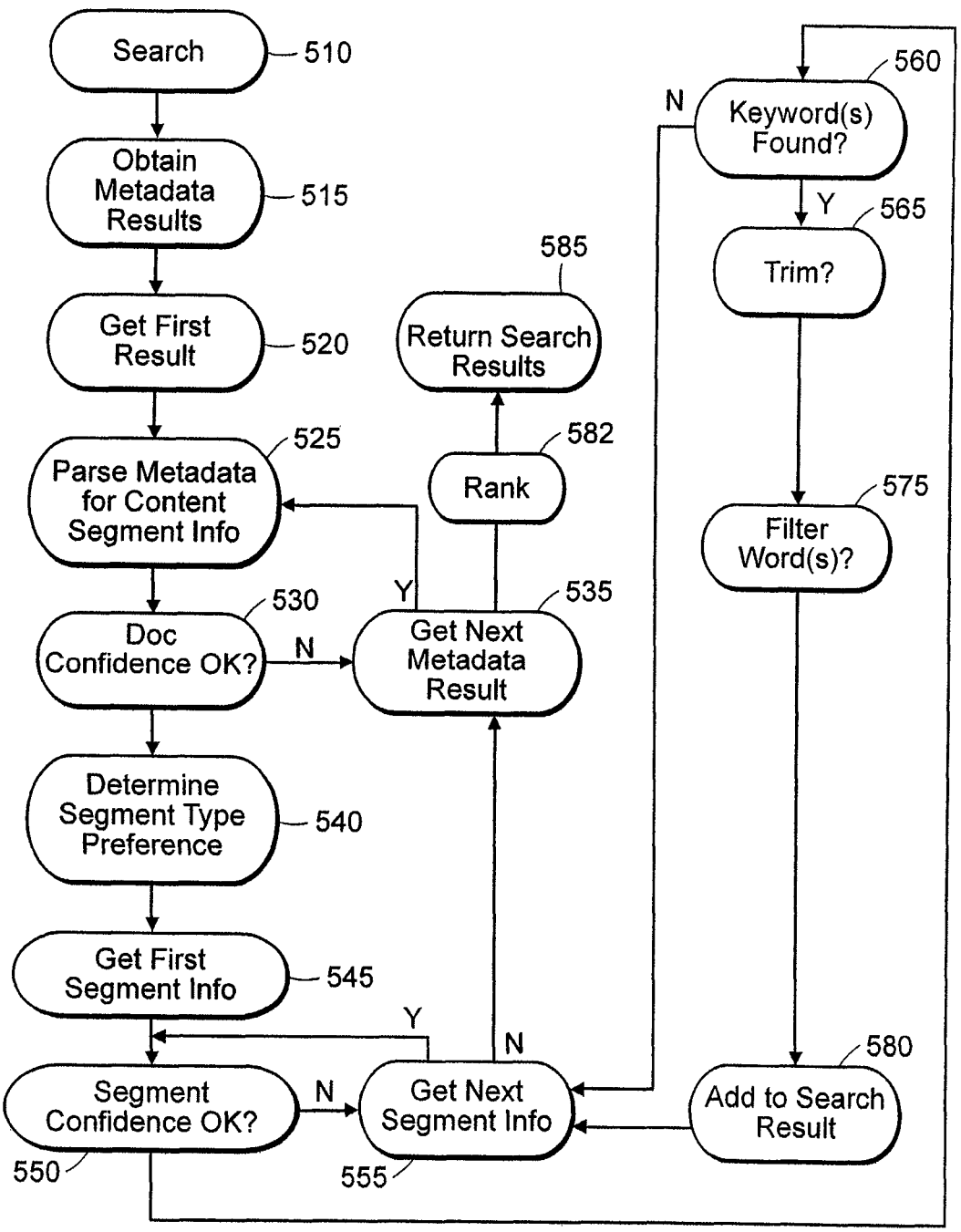

FIGS. 4 and 5 are diagrams illustrating a computerized method and apparatus for generating search snippets that enable user navigation of the underlying media content. Referring to FIG. 4, a client 410 interfaces with a search engine module 420 for searching an index 430 for desired audio/video content. The index includes a plurality of metadata associated with a number of discrete media content and enhanced for audio/video search as shown and described with reference to FIG. 2. The search engine module 420 also interfaces with a snippet generator module 440 that processes metadata satisfying a search query to generate the navigable search snippet for audio/video content for the client 410. Each of these modules can be implemented, for example, using a suitably programmed or dedicated processor (e.g., a microprocessor or microcontroller), hardwired logic, Application Specific Integrated Circuit (ASIC), and a Programmable Logic Device (PLD) (e.g., Field Programmable Gate Array (FPGA)).

FIG. 5 is a flow diagram illustrating a computerized method for generating search snippets that enable user-directed navigation of the underlying audio/video content. At step 510, the search engine 420 conducts a keyword search of the index 430 for a set of enhanced metadata documents satisfying the search query. At step 515, the search engine 420 obtains the enhanced metadata documents descriptive of one or more discrete media files/streams (e.g., audio/video podcasts).

At step 520, the snippet generator 440 obtains an enhanced metadata document corresponding to the first media file/stream in the set. As previously discussed with respect to FIG. 2, the enhanced metadata identifies content segments and corresponding timing information defining the boundaries of each segment within the media file/stream.

At step 525, the snippet generator 440 reads or parses the enhanced metadata document to obtain information on each of the content segments identified within the media file/stream. For each content segment, the information obtained preferably includes the location of the underlying media content (e.g. URL), a segment identifier, a segment type, a start offset, an end offset (or duration), the word or the group of words spoken during that segment, if any, and an optional confidence score.

Step 530 is an optional step in which the snippet generator 440 makes a determination as to whether the information obtained from the enhanced metadata is sufficiently accurate to warrant further search and/or presentation as a valid search snippet. For example, as shown in FIG. 2, each of the word segments 225 includes a confidence score 225f assigned by the speech recognition processor 100a. Each confidence score is a relative ranking (typically between 0 and 1) as to the accuracy of the recognized text of the word segment. To determine an overall confidence score for the enhanced metadata document in its entirety, a statistical value (e.g., average, mean, variance, etc.) can be calculated from the individual confidence scores of all the word segments 225.

Thus, if, at step 530, the overall confidence score falls below a predetermined threshold, the enhanced metadata document can be deemed unacceptable from which to present any search snippet of the underlying media content. Thus, the process continues at steps 535 and 525 to obtain and read/parse the enhanced metadata document corresponding to the next media file/stream identified in the search at step 510. Conversely, if the confidence score for the enhanced metadata in its entirety equals or exceeds the predetermined threshold, the process continues at step 540.

At step 540, the snippet generator 440 determines a segment type preference. The segment type preference indicates which types of content segments to search and present as snippets. The segment type preference can include a numeric value or string corresponding to one or more of the segment types. For example, if the segment type preference can be defined to be one of the audio speech segment types, e.g., "story," the enhanced metadata is searched on a story-by-story basis for a match to the search query and the resulting snippets are also presented on a story-by-story basis. In other words, each of the content segments identified in the metadata as type "story" are individually searched for a match to the search query and also presented in a separate search snippet if a match is found. Likewise, the segment type preference can alternatively be defined to be one of the video segment types, e.g., individual scene. The segment type preference can be fixed programmatically or user configurable.

At step 545, the snippet generator 440 obtains the metadata information corresponding to a first content segment of the preferred segment type (e.g., the first story segment). The metadata information for the content segment preferably includes the location of the underlying media file/stream, a segment identifier, the preferred segment type, a start offset, an end offset (or duration) and an optional confidence score. The start offset and the end offset/duration define the timing boundaries of the content segment. By referencing the enhanced metadata, the text of words spoken during that segment, if any, can be determined by identifying each of the word segments falling within the start and end offsets. For example, if the underlying media content is an audio/video podcast of a news program and the segment preference is "story," the metadata information for the first content segment includes the text of the word segments spoken during the first news story.

Step 550 is an optional step in which the snippet generator 440 makes a determination as to whether the metadata information for the content segment is sufficiently accurate to warrant further search and/or presentation as a valid search snippet. This step is similar to step 530 except that the confidence score is a statistical value (e.g., average, mean, variance, etc.) calculated from the individual confidence scores of the word segments 225 falling within the timing boundaries of the content segment.

If the confidence score falls below a predetermined threshold, the process continues at step 555 to obtain the metadata information corresponding to a next content segment of the preferred segment type. If there are no more content segments of the preferred segment type, the process continues at step 535 to obtain the enhanced metadata document corresponding to the next media file/stream identified in the search at step 510. Conversely, if the confidence score of the metadata information for the content segment equals or exceeds the predetermined threshold, the process continues at step 560.

At step 560, the snippet generator 440 compares the text of the words spoken during the selected content segment, if any, to the keyword(s) of the search query. If the text derived from the content segment does not contain a match to the keyword search query, the metadata information for that segment is discarded. Otherwise, the process continues at optional step 565.

At optional step 565, the snippet generator 440 trims the text of the content segment (as determined at step 545) to fit within the boundaries of the display area (e.g., text area 320 of FIG. 3). According to one embodiment, the text can be trimmed by locating the word(s) matching the search query and limiting the number of additional words before and after. According to another embodiment, the text can be trimmed by locating the word(s) matching the search query, identifying another content segment that has a duration shorter than the segment type preference and contains the matching word(s), and limiting the displayed text of the search snippet to that of the content segment of shorter duration. For example, assuming that the segment type preference is of type "story," the displayed text of the search snippet can be limited to that of segment type "sentence" or "paragraph".

At optional step 575, the snippet generator 440 filters the text of individual words from the search snippet according to their confidence scores. For example, in FIG. 2, a confidence score 225f is assigned to each of the word segments to represent a relative ranking that corresponds to the accuracy of the text of the recognized word. For each word in the text of the content segment, the confidence score from the corresponding word segment 225 is compared against a predetermined threshold value. If the confidence score for a word segment falls below the threshold, the text for that word segment is replaced with a predefined symbol (e.g., ---). Otherwise no change is made to the text for that word segment.

At step 580, the snippet generator 440 adds the resulting metadata information for the content segment to a search result for the underlying media stream/file. Each enhanced metadata document that is returned from the search engine can have zero, one or more content segments containing a match to the search query. Thus, the corresponding search result associated with the media file/stream can also have zero, one or more search snippets associated with it. An example of a search result that includes no search snippets occurs when the metadata of the original content descriptor contains the search term, but the timed word segments 105*a* of FIG. 2 do not.

The process returns to step 555 to obtain the metadata information corresponding to the next content snippet segment of the preferred segment type. If there are no more content segments of the preferred segment type, the process continues at step 535 to obtain the enhanced metadata document corresponding to the next media file/stream identified in the search at step 510. If there are no further metadata results to process, the process continues at optional step 582 to rank the search results before sending to the client 410.

At optional step 582, the snippet generator 440 ranks and sorts the list of search results. One factor for determining the rank of the search results can include confidence scores. For example, the search results can be ranked by calculating the sum, average or other statistical value from the confidence scores of the constituent search snippets for each search result and then ranking and sorting accordingly. Search results being associated with higher confidence scores can be ranked and thus sorted higher than search results associated with lower confidence scores. Other factors for ranking search results can include the publication date associated with the underlying media content and the number of snippets in each of the search results that contain the search term or terms. Any number of other criteria for ranking search results known to those skilled in the art can also be utilized in ranking the search results for audio/video content.

At step 585, the search results can be returned in a number of different ways. According to one embodiment, the snippet generator 440 can generate a set of instructions for rendering each of the constituent search snippets of the search result as shown in FIG. 3, for example, from the raw metadata information for each of the identified content segments. Once the instructions are generated, they can be provided to the search engine 420 for forwarding to the client. If a search result includes a long list of snippets, the client can display the search result such that a few of the snippets are displayed along with an indicator that can be selected to show the entire set of snippets for that search result.

Although not so limited, such a client includes (i) a browser application that is capable of presenting graphical search query forms and resulting pages of search snippets; (ii) a desktop or portable application capable of, or otherwise modified for, subscribing to a service and receiving alerts containing embedded search snippets (e.g., RSS reader applications); or (iii) a search applet embedded within a DVD (Digital Video Disc) that allows users to search a remote or local index to locate and navigate segments of the DVD audio/video content.

According to another embodiment, the metadata information contained within the list of search results in a raw data format are forwarded directly to the client 410 or indirectly to the client 410 via the search engine 420. The raw metadata information can include any combination of the parameters including a segment identifier, the location of the underlying content (e.g., URL or filename), segment type, the text of the word or group of words spoken during that segment (if any), timing information (e.g., start offset, end offset, and/or duration) and a confidence score (if any). Such information can then be stored or further processed by the client 410 according to application specific requirements. For example, a client desktop application, such as iTunes Music Store available from Apple Computer, Inc., can be modified to process the raw metadata information to generate its own proprietary user interface for enabling user-directed navigation of media content, including audio/video podcasts, resulting from a search of its Music Store repository.

Figure 6A:
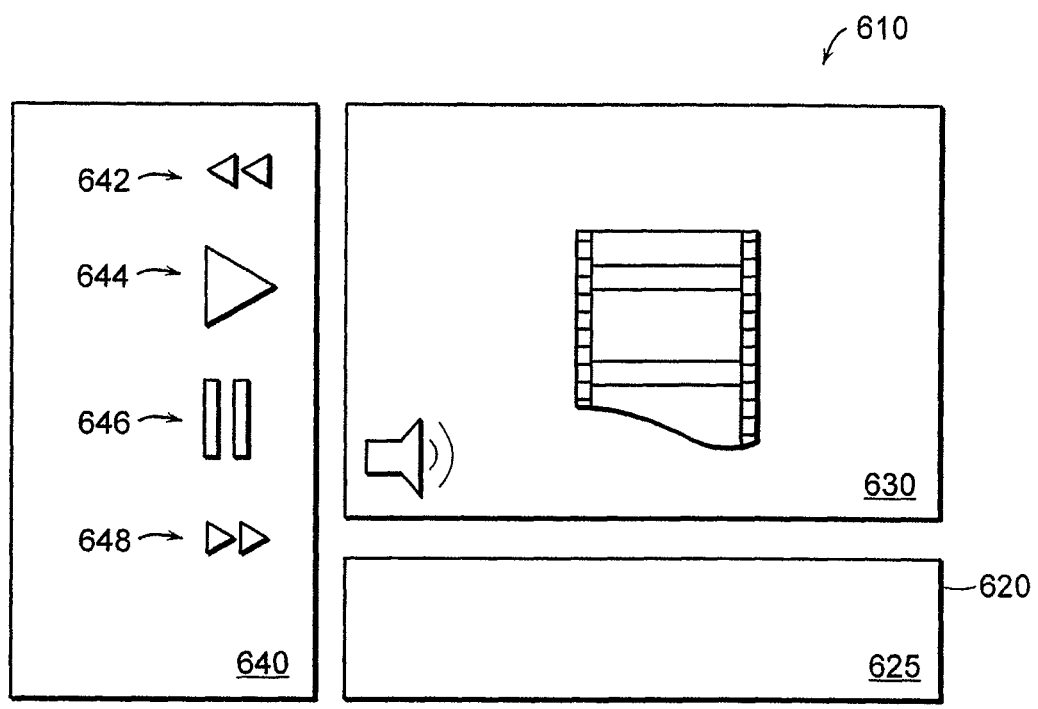
FIG. 6A is a diagram illustrating another example of a search snippet that enables user navigation of the underlying media content.

FIG. 6A is a diagram illustrating another example of a search snippet that enables user navigation of the underlying media content. The search snippet 610 is similar to the snippet described with respect to FIG. 3, and additionally includes a user actuated display element 640 that serves as a navigational control. The navigational control 640 enables a user to control playback of the underlying media content. The text area 620 is optional for displaying the text 625 of the words spoken during one or more segments of the underlying media content as previously discussed with respect to FIG. 3.

Typical fast forward and fast reverse functions cause media players to jump ahead or jump back during media playback in fixed time increments. In contrast, the navigational control 640 enables a user to jump from one content segment to another segment using the timing information of individual content segments identified in the enhanced metadata. As shown in FIG. 6A, the user-actuated display element 640 can include a number of navigational controls (e.g., Back 642, Forward 648, Play 644, and Pause 646). The Back 642 and Forward 648 controls can be configured to enable a user to jump between word segments, audio speech segments, video segments, non-speech audio segments, and marker segments. For example, if an audio/video podcast includes several content segments corresponding to different stories or topics, the user can easily skip such segments until the desired story or topic segment is reached.

Figure 6B:
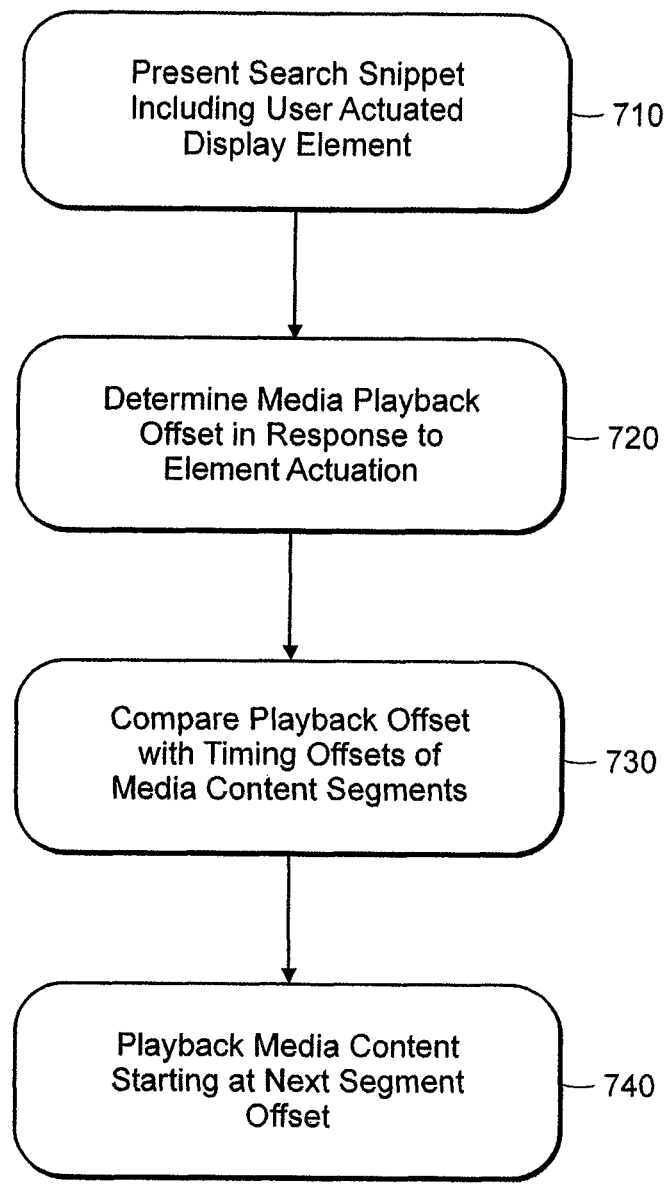
FIGS. 6B and 6C are diagrams illustrating a method for navigating media content using the search snippet of FIG. 6A.
Figure 6C:
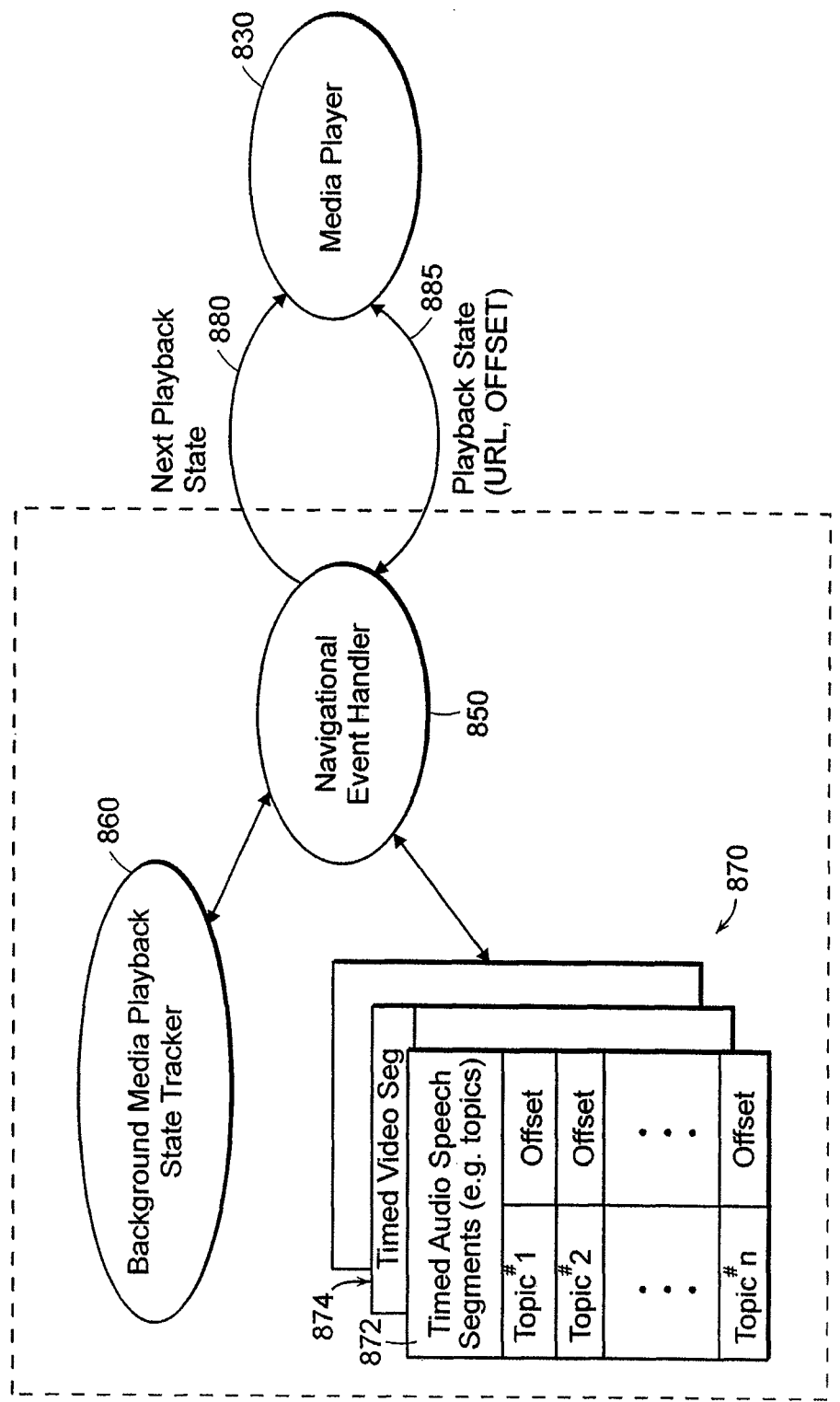

FIGS. 6B and 6C are diagrams illustrating a method for navigating media content using the search snippet of FIG. 6A. At step 710, the client presents the search snippet of FIG. 6A, for example, that includes the user actuated display element 640. The user-actuated display element 640 includes a number of individual navigational controls (i.e., Back 642, Forward 648, Play 644, and Pause 646). Each of the navigational controls 642, 644, 646, 648 is associated with an object defining at least one event handler that is responsive to user actuations. For example, when a user clicks on the Play control 644, the object event handler provides the media player 630 with a link to the media file/stream and directs the player 630 to initiate playback of the media content from the beginning of the file/stream or from the most recent playback offset.

At step 720, in response to an indication of user actuation of Forward 648 and Back 642 display elements, a playback offset associated with the underlying media content in playback is determined. The playback offset can be a timestamp or other indexing value that varies according to the content segment presently in playback. This playback offset can be determined by polling the media player or by autonomously tracking the playback time.

For example, as shown in FIG. 6C, when the navigational event handler 850 is triggered by user actuation of the Forward 648 or Back 642 control elements, the playback state of media player module 830 is determined from the identity of the media file/stream presently in playback (e.g., URL or filename), if any, and the playback timing offset. Determination of the playback state can be accomplished by a sequence of status request/response 855 signaling to and from the media player module 830. Alternatively, a background media playback state tracker module 860 can be executed that keeps track of the identity of the media file in playback and maintains a playback clock (not shown) that tracks the relative playback timing offsets.

At step 730 of FIG. 6B, the playback offset is compared with the timing information corresponding to each of the content segments of the underlying media content to determine which of the content segments is presently in playback. As shown in FIG. 6C, once the media file/stream and playback timing offset are determined, the navigational event handler 850 references a segment list 870 that identifies each of the content segments in the media file/stream and the corresponding timing offset of that segment. As shown, the segment list 870 includes a segment list 872 corresponding to a set of timed audio speech segments (e.g., topics). For example, if the media file/stream is an audio/video podcast of an episode of a daily news program, the segment list 872 can include a number of entries corresponding to the various topics discussed during that episode (e.g., news, weather, sports, entertainment, etc.) and the time offsets corresponding to the start of each topic. The segment list 870 can also include a video segment list 874 or other lists (not shown) corresponding to timed word segments, timed non-speech audio segments, and timed marker segments, for example. The segment lists 870 can be derived from the enhanced metadata or can be the enhanced metadata itself.

At step 740 of FIG. 6B, the underlying media content is played back at an offset that is prior to or subsequent to the offset of the content segment presently in playback. For example, referring to FIG. 6C, the event handler 850 compares the playback timing offset to the set of predetermined timing offsets in one or more of the segment lists 870 to determine which of the content segments to playback next. For example, if the user clicked on the "forward" control 848, the event handler 850 obtains the timing offset for the content segment that is greater in time than the present playback offset. Conversely, if the user clicks on the "backward" control 842, the event handler 850 obtains the timing offset for the content segment that is earlier in time than the present playback offset. After determining the timing offset of the next segment to play, the event handler 850 provides the media player module 830 with instructions 880 directing playback of the media content at the next playback state (e.g., segment offset and/or URL).

Thus, an advantage of this aspect of the invention is that a user can control media using a client that is capable of jumping from one content segment to another segment using the timing information of individual content segments identified in the enhanced metadata. One particular application of this technology can be applied to portable player devices, such as the iPod audio/video player available from Apple Computer, Inc. For example, after downloading a podcast to the iPod, it is unacceptable for a user to have to listen to or view an entire podcast if he/she is only interested in a few segments of the content. Rather, by modifying the internal operating system software of iPod, the control buttons on the front panel of the iPod can be used to jump from one segment to the next segment of the podcast in a manner similar to that previously described.

Timed Based Placement of Advertising Content

According to another aspect, the invention features a computerized method and apparatus for dynamic presentation of advertising, factual, informational content and combinations thereof (hereinafter referred to as "advertising content" generally) using shifting content in a multimedia file to drive advertising placement. In particular embodiments, the advertising content is dynamically presented according to the playback of corresponding segments identified within a media file or stream. For example, particular embodiments can incorporate metadata with timing information so that keywords can be associated with specific times or time ranges within a media file or stream. These words can be associated with advertisements, or the words could be used to assess the topic of a segment of the media file, and these topics can be associated with advertisements.

The advertising content can be placed around the frame of the video, if viewing on a computer screen. The advertisements can be placed on the small screen of a portable device such as an iPod. The advertisements can rotate with time, and be selected based on the keywords in a timed locality of the key timed words. Natural Language Processing (NLP) techniques, for example, can be used to determine the proper segmentation of the audio/video/multimedia files. Video clues, such as scene changes, words on the screen, can also be used to determine the proper segmentation of the source files, as can audio clues, such as pauses, bylines, laughter, or applause. The advertising content can be confined to the segment so determined, or follow a short time after the segment.

In addition, the keywords can be used to generate a timed index of ads, or be submitted at the proper time to another system which returns an ad. Clicking on an advertisement or advertisement text can open another window with more information. If the media are transferred to a portable device, such as an iPod, advertising content in the form of text/images/sounds/video can also be transferred. The screen of the portable device can be used to display such advertising content. Semi-transparent icons can overlay a portion of video content to indicate the availability of additional content, such as advertisements, information or facts. User action while the icon is present, such as pressing a button on the portable device or another remote control may interrupt the current playback of the underlying media file/stream to switch to an advertisement. User input can be taken any time that advertising content is displayed; information on which advertising content are clicked can be transferred to a computer next time the portable device is synchronized/updated. Advertising content in the form of text can overlay on top of video or scrolled at the bottom of the video.

Figure 7A:
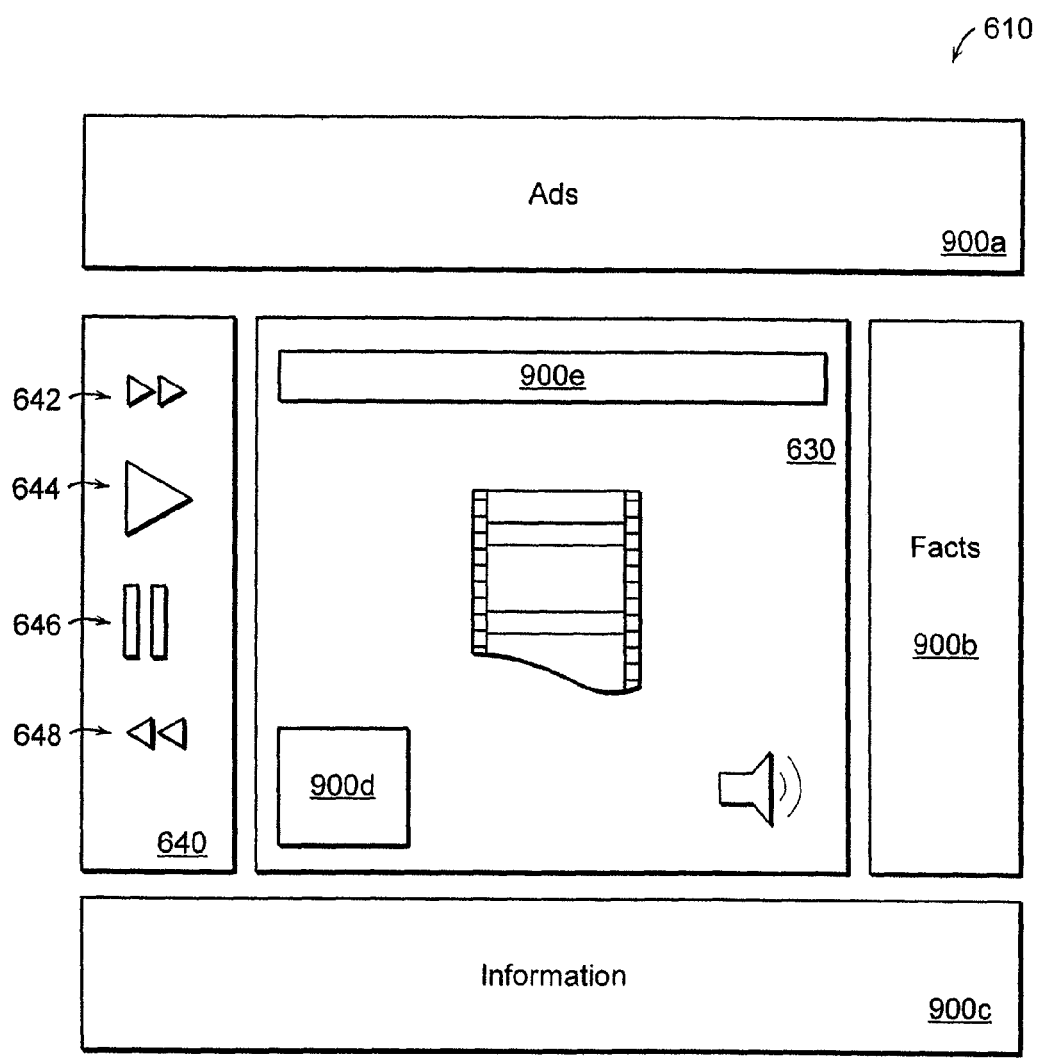
Figure 7B:
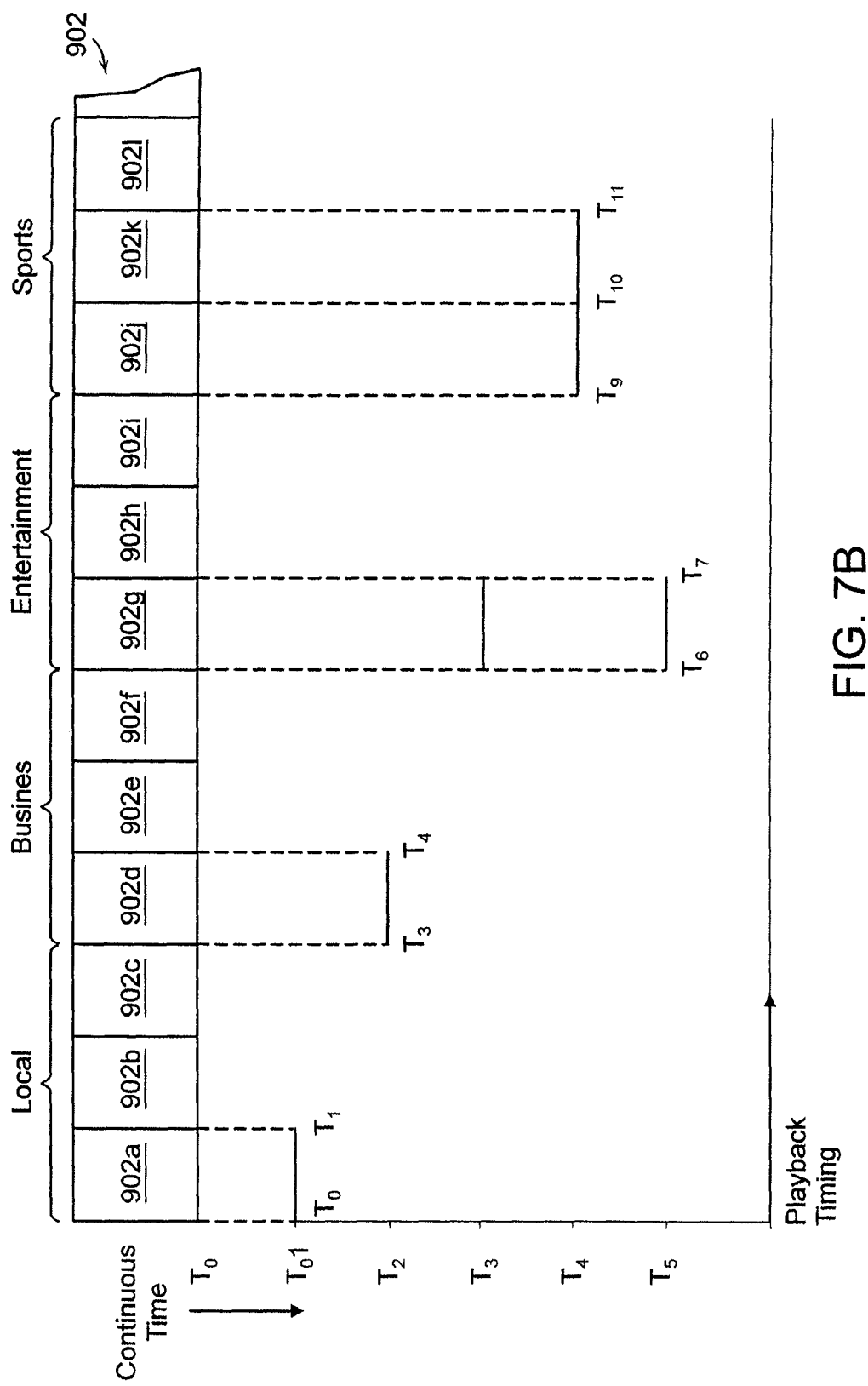

FIGS. 7A-7C are diagrams that illustrate dynamic presentation of advertising content according to the playback of corresponding segments. For purposes of example only, the diagram of FIG. 7A illustrates a graphical user interface 610 that is similar to the search snippet of FIG. 6A. The snippet or other graphical user interface 610 includes a media player 630 capable of audio/video playback and a user actuated display element 640 that serves as a navigational control. Advertising content 900a, factual content 900b and informational content 900c (advertising content 900, generally) are shown positioned about the media player 630. The advertising content can also overlay video content, for example, at fixed positions 900d or scrolling across a portion of the video 900e.

The navigational control 640 enables a user to control playback of the underlying media content. For example, as previously discussed with respect to FIGS. 6A-6C, the user-actuated display element 640 can include a number of navigational controls (e.g . . . , Back 642, Forward 648, Play 644, and Pause 646). The Back 642 and Forward 648 controls can be configured to enable a user to jump between word segments, audio speech segments, video segments, non-speech audio segments, and marker segments. The configuration can be accomplished in one embodiment by a drop down menu which has multiple selections which describe different methods of skipping such as by time, by word, by story, or by topic, for which the selected menu item configures the navigation controls. In another embodiment of the controls, a context menu could be displayed when a navigation control receives a right-click, the context menu may have entries to jump in time, over words, over sentences, or over stories. For example, if an audio/video podcast includes several content segments corresponding to different stories or topics, the user can easily skip forward and back among such segments until the desired story or topic segment is reached. According to embodiments of the computerized method and apparatus for dynamic presentation of advertising content, different sets of advertising content 900 can be dynamically presented according to which of the content segments is presently in playback as shown in FIGS. 7B and 7C.

FIG. 7B is a timing diagram illustrating playback of an exemplary media file or stream. In particular, FIG. 7B illustrates the audio/video content segments (902a, 902b, ... 902l) identified within a media file or stream 902 using the enhanced metadata of FIG. 2. In this example, the media file/stream 902 is an audio or video podcast of a typical news program. The enhanced metadata identifies a number of topic and story segments using, for example, speech recognition processor 100a and a natural language processor 100b. As shown, the topic segments include local news, business, entertainment, and sports. Each content segment corresponding to a topic further includes a number of constituent story segments. For example, the content segments that constitute the topic segments "sports" may include story segments about the Boston Red Sox 902j, Boston Celtics 902k and New England Patriots 902l, respectively.

Although the media file or stream 902 can be played back linearly from time $T_0$ to the end of the file or stream, the media file/stream 902 can also be played back in an arbitrary manner as shown in FIG. 7B. For example, since the navigational control 640 enables a user to jump from one topic segment to another, a user can direct the media player 630 to playback the first news story segment 902a of the "local" segment and then jump to the first story segment 902d of the "business" segment. Preferably, the advertising content 900 is presented in a manner such that it relates to the topic, story, scene or other characteristic of the content segment in playback. For example, during playback of the story segment 902j regarding the Boston Red Sox, the advertising content can include advertisements on tickets, facts including team statistics from the prior year, and schedule information for the upcoming season. In order that the advertising content consistently relates to the content segments during such arbitrary playback of the media file or stream, an association is made between the advertising content and each of the content segments regardless of whether media playback is linear or arbitrary.

For example, FIG. 7C is a diagram illustrating a data map 904 that associates advertising content with each of the content segments. As shown, the data map 904 associates a segment identifier 904a and its corresponding start and end offsets (or duration) 904b, 904c with a combination of advertising content identifiers 904d, 904e, and 904f. The advertising content identifiers 904d, 904e, and 904f are used to select the actual advertising content stored in a corresponding data repository. Thus, with each transition from one content segment to another, an appropriate set of advertising, factual and information content can be presented that is related to the topics, stories, scenes or other segment characteristics of the underlying media content.

According to a first embodiment, the method and apparatus involves a client receiving media content and corresponding metadata for playback. The metadata identifies content segments and corresponding timing information derived from the media content using one or more media processing techniques. During playback of the media content, the client identifies the content segment in playback by comparing a playback status with the timing information from the metadata. Once the content segment is identified, the client presents a set of factual, informational, or advertising content associated with the content segment in playback.

Figure 8A:
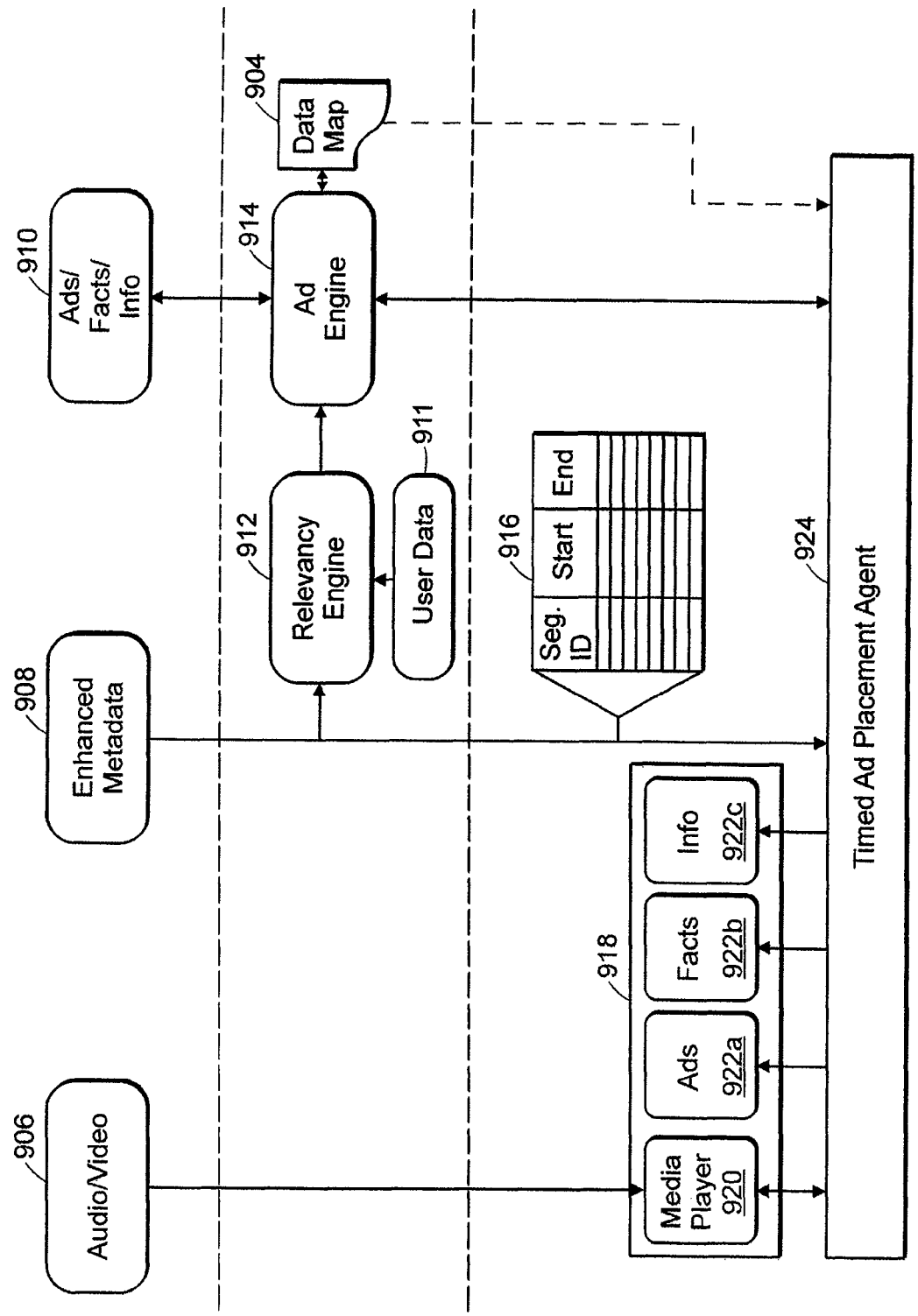
FIG. 8A is a diagram illustrating an apparatus for presenting a set of factual, informational, or advertising content associated with the content segment in playback.

For example, FIG. 8A is a diagram illustrating an apparatus for presenting a set of factual, informational, or advertising content associated with the content segment in playback. As shown, FIG. 8A includes a number of repositories for storing audio/video content 906, enhanced metadata 908, and advertising content 910 (e.g., advertisements, facts and information). Such advertising content 910 can be in the form of audio, video, text, graphics or combinations thereof. The apparatus further includes a relevancy engine 912 that interfaces with an advertising engine 914 to generate the data map 904 of FIG. 7C. An agent 924 for timed placement of advertising content determines the advertising content, namely advertisements 922a, facts 922b and information 922c, to present via a display module 918 as discussed below. The relevancy engine 912, advertising engine 914 and placement agent 924 each can be implemented, for example, using a suitably programmed or dedicated processor (e.g., a microprocessor or microcontroller), hardwired logic, Application Specific Integrated Circuit (ASIC), and a Programmable Logic Device (PLD) (e.g., Field Programmable Gate Array (FPGA)).

Figure 8B:
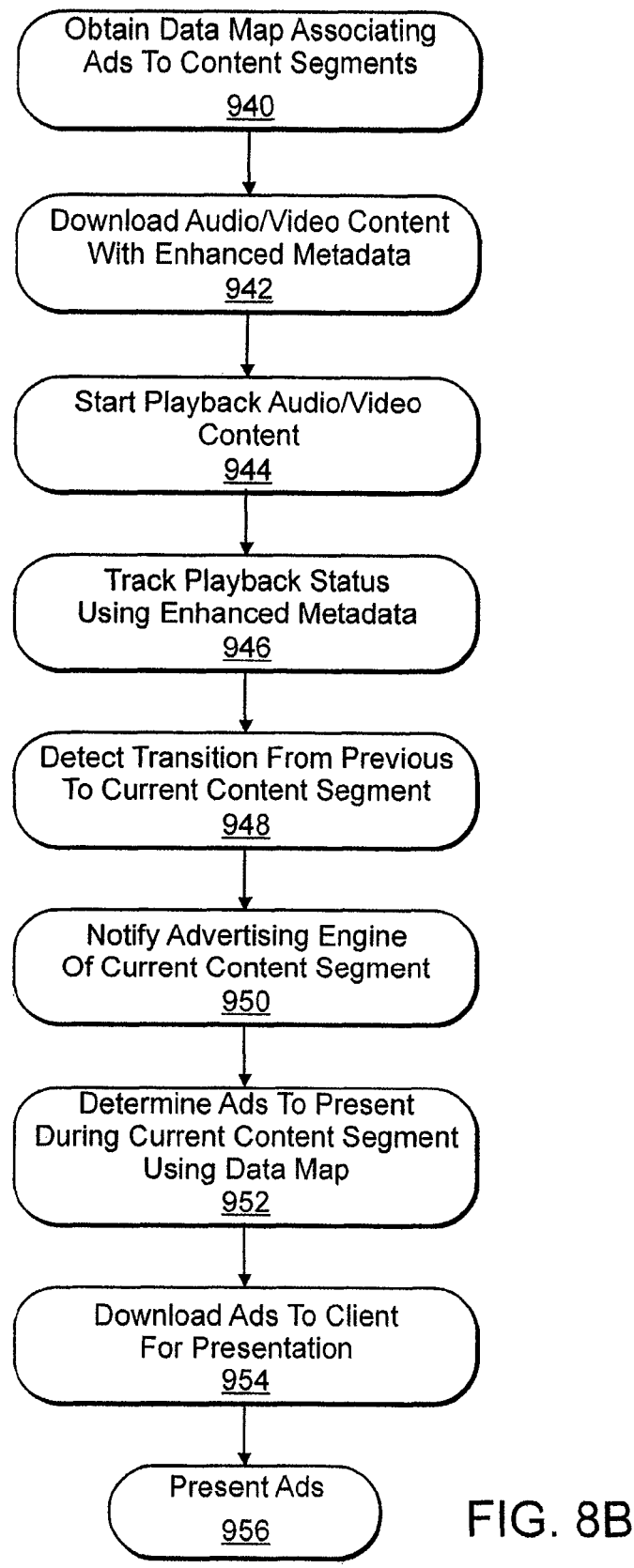
FIG. 8B is a flow diagram illustrating a computerized method for dynamic presentation of a set of factual, informational, or advertising content associated with the content segment in playback.

FIG. 8B is a flow diagram illustrating a computerized method for dynamic presentation of a set of factual, informational, or advertising content associated with the content segment in playback. The placement agent keeps track of the playback status of a selected media file or stream. When the agent detects a transition from one content segment to another, it communicates with the advertising engine requesting the next set of advertising content to present via the display module.

At step 940, the advertising engine 914 obtains the data map 904 that maps timed content segments with corresponding advertising content as shown in FIG. 7C. The data map 904 can be generated with cooperation of the relevancy engine 912 and the advertising engine 914.

For example, as shown in FIG. 8A, the relevancy engine 912 receives the enhanced metadata of FIG. 2 corresponding to the media file/stream selected for presentation by the media player 920. The relevancy engine may also receive user data 911 that is specific to the user of the system. The relevancy engine 912 processes the enhanced metadata and identifies each of the word segments 220 of FIG. 2 that are deemed to be relevant. Relevancy can be determined by directing the relevancy engine 912 to compare each of the word segments 220 against a predetermined set of key words. The relevancy engine 912 forwards information for each of the relevant word segments (e.g., segment identifier 225a, word 225b, start offset 225c, end offset 225d and/or duration 225e) to the advertising engine 914. The advertising engine 914 then associates each of the relevant word segments to advertising content identifiers mapped to those key words, resulting in the data map of FIG. 7C.

At step 942, the audio/video content 906 is downloaded to the media player 920 for presentation via the display module 918, such as a desktop or portable device. In addition, the enhanced metadata 908 corresponding to the audio/video content 906 is downloaded to the placement agent 924.

Alternatively, a segment list 916 that is derived from the enhanced metadata 908 can be downloaded to the placement agent 924. The segment list 916 identifies each of the content segments containing the relevant key words by segment identifier, start offset and end offset.

At step 944, the media player 920 starts playback of the audio/video content from the media file/stream. At step 946, the placement agent 924 tracks the playback status of the media file/stream using the enhanced metadata 908 or segment list 916. According to one embodiment, the playback status is tracked by the placement agent 924 polling the media player 920 for the playback status information, including the identity of the media file/stream and current playback timing offset. Alternatively, the placement agent 924 keeps track of the identity of the media file in playback and maintains a playback clock that tracks the playback timing offset (e.g., in seconds).

At step 948, the placement agent 924 continues to track the playback status until it detects a transition from a previous content segment (including no previous segment) to a current content segment. For example, with respect to FIG. 7B, a segment transition is detected when the playback timing offset crosses timing offset $T_{10}$ which divides the Red Sox story segment 902*j* and the New England Patriots story segment 902*k*. In particular, the playback offset is compared with the timing information of the enhanced metadata 908 or segment list 916 to determine which of the content segments is presently in playback. At step 950, the placement agent 924 communicates with the advertising engine 914 to notify the engine of the transition by providing the current segment identifier. In response, at step 952, the advertising engine 914 references the data map 904 of FIG. 7C to determine the next set of advertising content to present with respect to playback of the current content segment.

At step 954, the advertising engine accesses the advertising content 910 from a repository using the advertising content identifiers 904*d*, 904*e*, 904*f* determined from the data map 904 of FIG. 7C and then downloads such advertising content to the placement agent 924. The placement agent 924, in turn, loads the selected advertising content into corresponding display objects 922 (e.g., windows, frames, scrolling text, etc.) of the display module 918 for presentation at step 956.

Figure 8C:
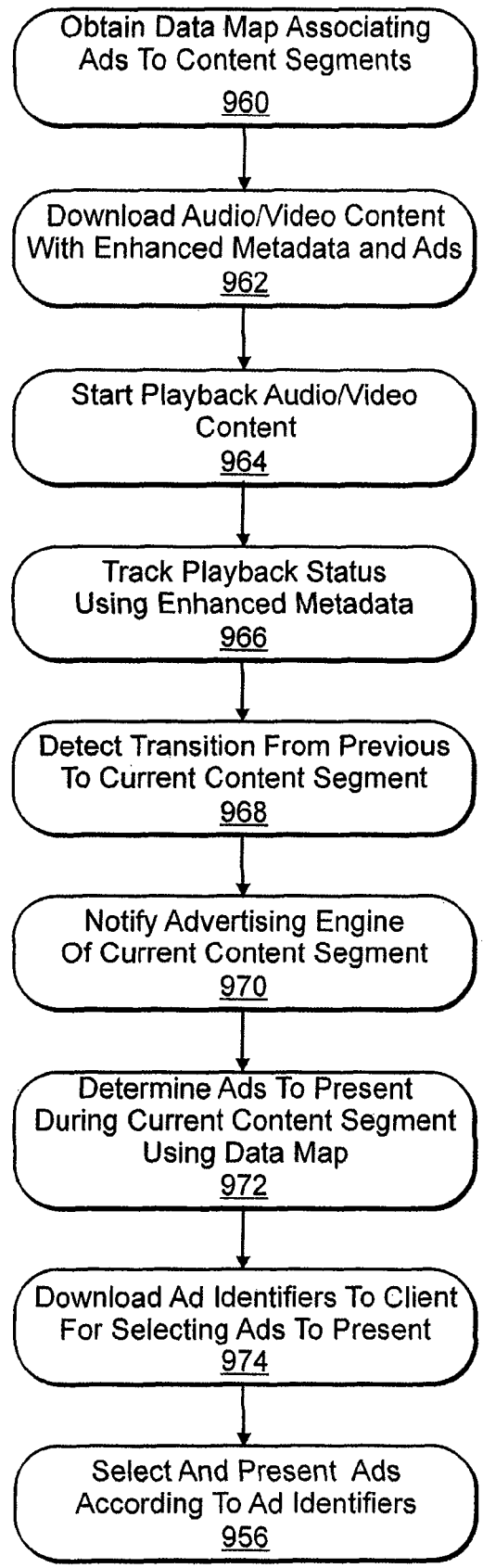
FIG. 8C is a flow diagram illustrating another computerized method for dynamic presentation of a set of factual, informational, or advertising content associated with the content segment in playback.

FIG. 8C is a flow diagram illustrating another computerized method for dynamic presentation of a set of factual, informational, or advertising content associated with the content segment in playback. The advertising engine downloads a set of advertising content available for dynamic presentation along with the media file or stream selected for playback. The placement agent keeps track of the playback status of the media file or stream. When the agent detects a transition from one content segment to another, it communicates with the advertising engine requesting an indication of which of the downloaded advertising content to present via the display module.

At step 960, the advertising engine 914 obtains the data map 904 that maps timed content segments with corresponding advertising content as shown in FIG. 7C and previously discussed with respect to FIG. 8B. At step 962, the audio/video content 906 selected for playback is downloaded to the media player 920 for presentation via the display module 918, such as a desktop or portable device, and the advertising engine 914 downloads a set of advertising content to the placement agent 924. The enhanced metadata 908 corresponding to the audio/video content 906 is also downloaded to the placement agent 924. Alternatively, a segment list 916 that is derived from the enhanced metadata 908 can be downloaded to the placement agent 924. The segment list 916 identifies each of the content segments containing the relevant key words by segment identifier, start offset and end offset.

At step 964, the media player 920 starts playback of the audio/video content from the media file/stream. At step 966, the placement agent 924 tracks the playback status of the media file/stream using the enhanced metadata 908 or segment list 916. According to one embodiment, the playback status is tracked by the placement agent 924 polling the media player 920 for the playback status information, including the identity of the media file/stream and current playback timing offset. Alternatively, the placement agent 924 keeps track of the identity of the media file in playback and maintains a playback clock that tracks the playback timing offset (e.g., in seconds).

At step 968, the placement agent 924 continues to track the playback status until it detects a transition from a previous content segment (including no previous segment) to a current content segment. In particular, the playback offset is compared with the timing information of the enhanced metadata 908 or segment list 916 to determine which of the content segments is presently in playback. At step 970, the placement agent 924 communicates with the advertising engine 914 to notify the engine of the transition by providing the current segment identifier. In response, at step 972, the advertising engine 914 references the data map 904 of FIG. 7C to determine the next set of advertising content to present with respect to playback of the current content segment.

At step 974, the advertising engine 914 downloads the advertising content identifiers 904*d*, 904*e*, 904*f* determined from the data map 904 of FIG. 7C that correspond to the next set of advertising content to present. At step 976, the placement agent 924 uses the advertising content identifiers 904*d*, 904*e*, and 904*f* to select the corresponding advertising content from the available set of advertising content previously downloaded. The placement agent 924 then loads the selected advertising content into corresponding display objects 922 (e.g., windows, frames, scrolling text, etc.) of the display module 918 for presentation.

Figure 8D:
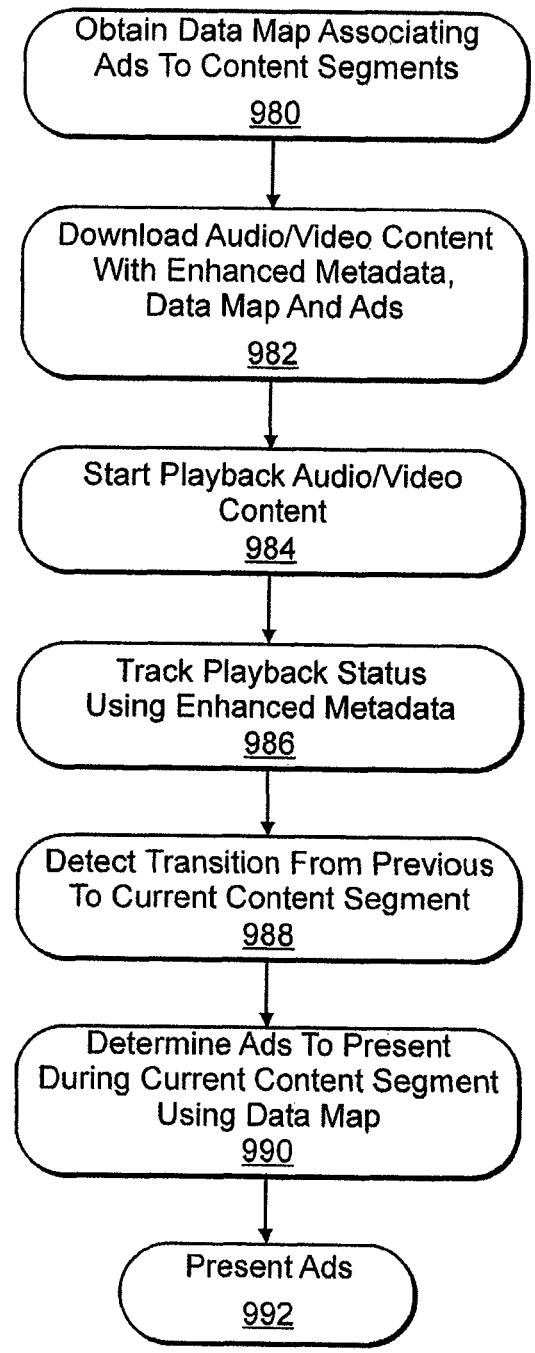
FIG. 8D is a flow diagram illustrating another computerized method for dynamic presentation of a set of factual, informational, or advertising content associated with the content segment in playback.

FIG. 8D is a flow diagram illustrating another computerized method for dynamic presentation of a set of factual, informational, or advertising content associated with the content segment in playback. The advertising engine downloads a set of advertising content available for dynamic presentation and the data map along with the media file or stream selected for playback. The data map is a data structure maps timed content segments with corresponding advertising content. The placement agent keeps track of the playback status of the media file or stream. When the agent detects a transition from one content segment to another, it references the data map to determine which of the downloaded advertising content to present via the display module.

At step 980, the advertising engine 914 obtains the data map 904 that maps timed content segments with corresponding advertising content as shown in FIG. 7C and previously discussed with respect to FIG. 8B. At step 982, the audio/video content 906 and advertising content 910 are downloaded to for presentation via the display module 918, such as a desktop or portable device. In addition, the data map 904 and enhanced metadata 908 corresponding to the audio/video content 906 are downloaded to the placement agent 924. Alternatively, the data map 904 and a segment list 916 that is derived from the enhanced metadata 908 can be downloaded to the placement agent 924. The segment list 916 identifies each of the content segments containing the relevant key words by segment identifier, start offset and end offset.

At step 984, the media player 920 starts playback of the audio/video content from the media file/stream. At step 986, the placement agent 924 tracks the playback status of the media file/stream using the enhanced metadata 908 or segment list 916. According to one embodiment, the playback status is tracked by the placement agent 924 polling the media player 920 for the playback status information, including the identity of the media file/stream and current playback timing offset. Alternatively, the placement agent 924 keeps track of the identity of the media file in playback and maintains a playback clock that tracks the playback timing offset (e.g., in seconds).

At step 988, the placement agent 924 continues to track the playback status until it detects a transition from a previous content segment (including no previous segment) to a current content segment. In particular, the playback offset is compared with the timing information of the enhanced metadata 908 or segment list 916 to determine which of the content segments is presently in playback. At step 990, once a segment transition is detected, the placement agent 924 references the data map 904 of FIG. 7C. The placement agent 924 uses the current segment identifier to index into the data map 904 and determine the advertising content identifiers 904d, 904e, and 904f for the next set of advertising content to present.

At step 992, the placement agent 924 uses the advertising content identifiers 904d, 904e, and 904f to select the corresponding advertising content from the available set of advertising content previously downloaded. The placement agent 924, in turn, loads the selected advertising content into corresponding display objects 922 (e.g., windows, frames, scrolling text, etc.) of the display module 918 for presentation.

According to a second embodiment, the method and apparatus involves a server receiving obtaining metadata corresponding to media content in playback at a client. The metadata identifies content segments and corresponding timing information derived from the media content using one or more media processing techniques. During playback of the media content, the server receives a playback status of the media content from the client. The server identifies the current content segment in playback by comparing the playback status with the timing information from the metadata and then directs the client to present a set of factual, informational, or advertising content associated with the content segment in playback.

Figure 9A:
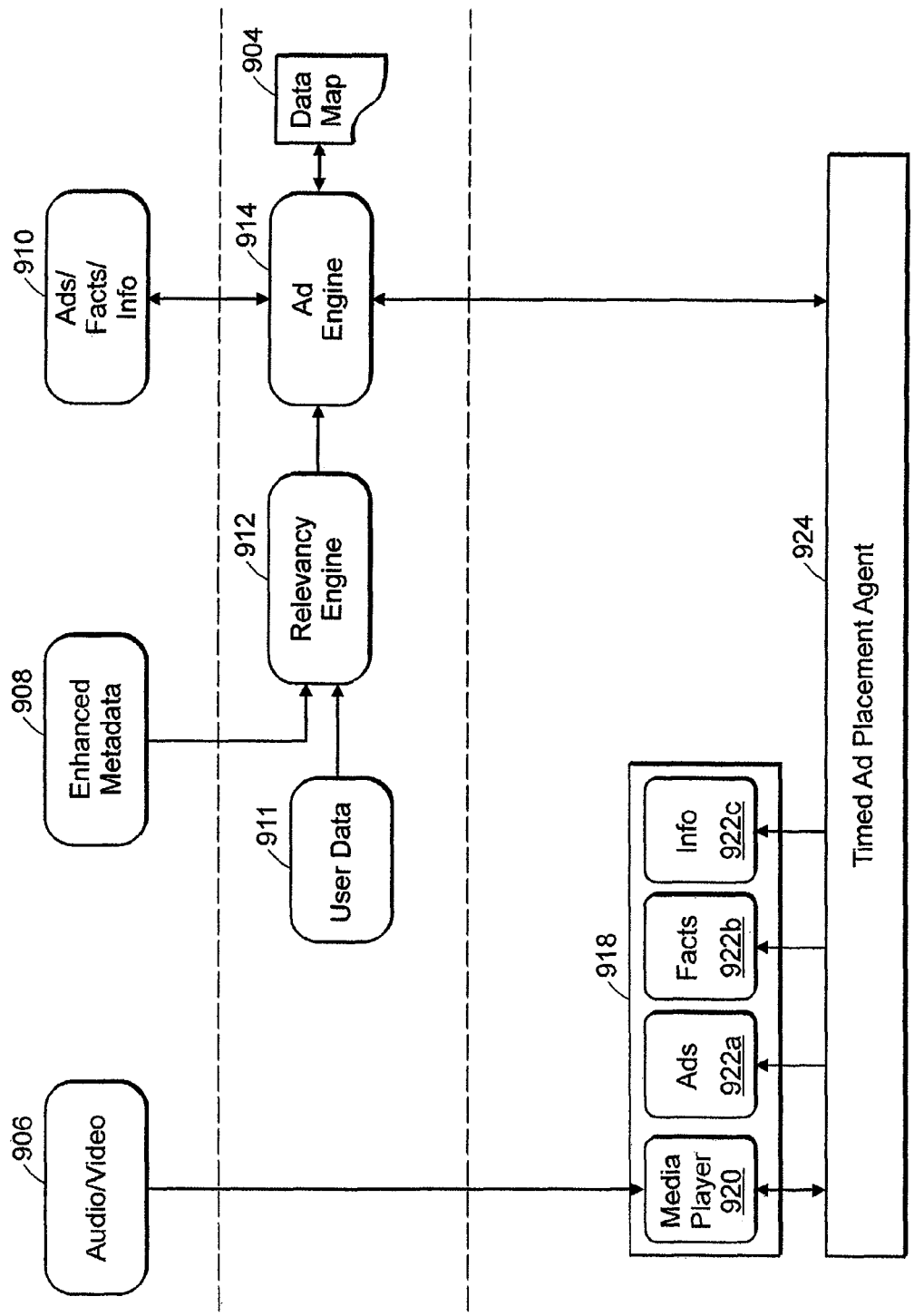
FIG. 9A is a diagram illustrating an apparatus for presenting a set of factual, informational, or advertising content associated with the content segment in playback.

For example, FIG. 9A is a diagram illustrating an apparatus for presenting a set of factual, informational, or advertising content associated with the content segment in playback. As shown, FIG. 9A includes a number of repositories for storing audio/video content 906, enhanced metadata 908, and advertising content 910 (e.g., advertisements, facts and information). Such advertising content 910 can be in the form of audio, video, text, graphics or combinations thereof. The apparatus further includes a relevancy engine 912 that interfaces with an advertising engine 914 and user data 911 to generate the data map 904 of FIG. 7C. An agent 924 for timed placement of advertising content determines the advertising content, namely advertisements 922a, facts 922b and information 922c, to present via a display module 918 as discussed below. For example, if the content is determined to be about computer games, and the user data 911 contains the age and the type of computer that the user owns (such as a Mac), the advertising content may be specific to the age group of the user and be limited to games only for the Mac. The relevancy engine 912, advertising engine 914 and placement agent 924 each can be implemented, for example, using a suitably programmed or dedicated processor (e.g., a microprocessor or microcontroller), hardwired logic, Application Specific Integrated Circuit (ASIC), and a Programmable Logic Device (PLD) (e.g., Field Programmable Gate Array (FPGA)).

Figure 9B:
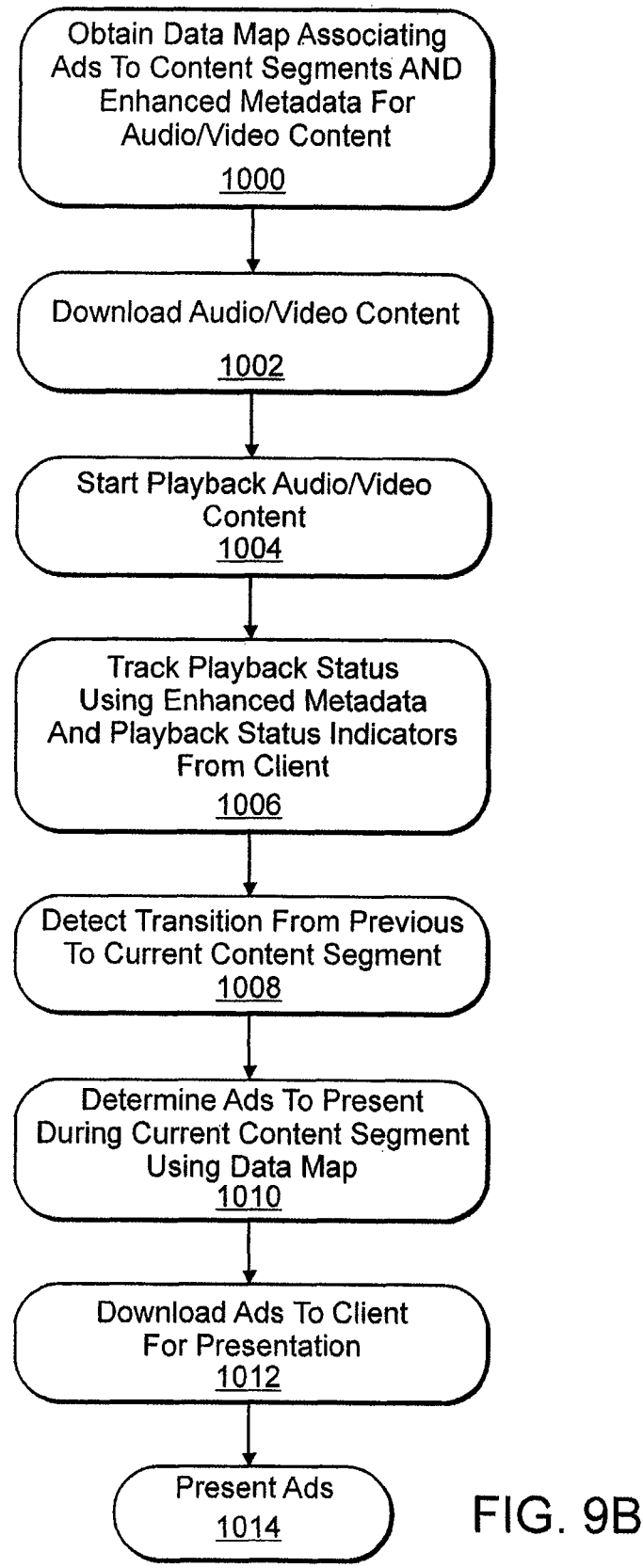
FIG. 9B is a flow diagram illustrating a computerized method for dynamic presentation of a set of factual, informational, or advertising content associated with the content segment in playback.

FIG. 9B is a flow diagram illustrating a computerized method for dynamic presentation of a set of factual, informational, or advertising content associated with the content segment in playback. The advertising engine keeps track of the playback status of a media file or stream. When the advertising engine detects a transition from one content segment to another, it communicates with the placement agent to download the next set of advertising content to present via the display module.

At step 1000, the advertising engine 914 obtains the data map 904 that maps timed content segments with corresponding advertising content as shown in FIG. 7C. The data map 904 can be generated with cooperation of the relevancy engine 912 and the advertising engine 914 as previously discussed with respect to FIG. 8A. At step 1002, the audio/video content 906 is downloaded to the media player 920 for presentation via the display module 918, such as a desktop or portable device. At step 1004, the media player 920 starts playback of the audio/video content from the media file/stream.

At step 1006, the advertising engine 914 tracks the playback status using the enhanced metadata 908 or data map 904 and playback status indicators received from the placement agent 924 (e.g. playback timing offsets). The playback status indicators received from the placement agent 924 can be determined by polling the media player 920 for the playback status information, including the identity of the media file/stream and current playback timing offset. Alternatively, the playback status indicators received from the placement agent 924 can be determined by the agent keeping track of the identity of the media file in playback and maintaining a playback clock that tracks the playback timing offset (e.g., in seconds). Using the playback status indicators from the placement agent 924, the advertising engine 914 then references either the enhanced metadata 908 or data map 904 to determine which of the content segments is currently in playback.

At step 1008, the advertising engine 914 continues to track the playback status until it detects a transition from a previous content segment (including no previous segment) to a current content segment. For example, with respect to FIG. 7B, a segment transition is detected when the playback timing offset crosses timing offset T10 which divides the Red Sox story segment 902j and the New England Patriots story segment 902k. In particular, the playback offset is compared with the timing information of the enhanced metadata 908 or data map 904 to determine which of the content segments is presently in playback. At step 1010, once a segment transition has been detected, the advertising engine 914 references the data map 904 of FIG. 7C to determine the next set of advertising content to present based on the identifier of the current content segment in playback.

At step 1012, the advertising engine accesses the advertising content 910 from a repository using the advertising content identifiers 904d, 904e, 904f determined from the data map 904 of FIG. 7C and then downloads such advertising content to the placement agent 924. The placement agent 924, in turn, loads the selected advertising content into corresponding display objects 922 (e.g., windows, frames, scrolling text, etc.) of the display module 918 by the placement agent 924 for presentation at step 1014.

Figure 9C:
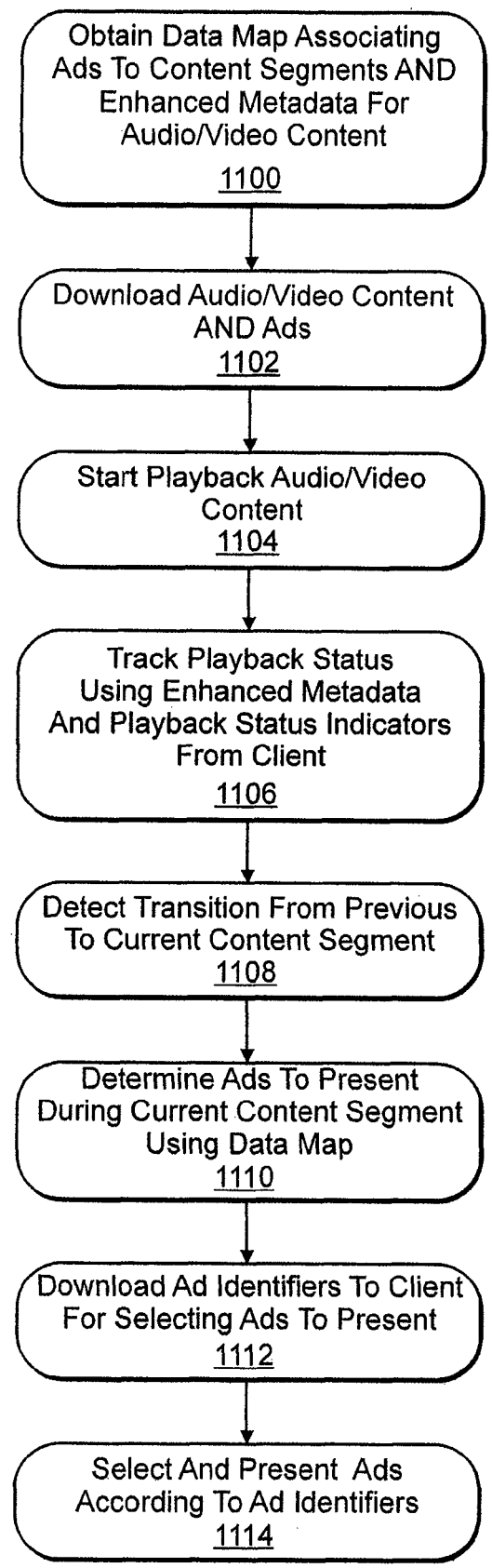
FIG. 9C is a flow diagram illustrating another computerized method for dynamic presentation of a set of factual, informational, or advertising content associated with the content segment in playback.

FIG. 9C is a flow diagram illustrating another computerized method for dynamic presentation of a set of factual, informational, or advertising content associated with the content segment in playback. The advertising engine downloads a set of advertising content available for dynamic presentation along with the media file or stream selected for playback. The advertising engine 914 keeps track of the playback status of a media file or stream. When the advertising engine 9124 detects a transition from one content segment to another, it communicates with the placement agent 924 to identify the next set of advertising content to present via the display module 918.

At step 1100, the advertising engine 914 obtains the data map 904 that maps timed content segments with corresponding advertising content as shown in FIG. 7C and the enhanced metadata 908 corresponding to the media file/stream selected for playback. The data map 904 can be generated with cooperation of the relevancy engine 912 and the advertising engine 914 as previously discussed with respect to FIG. 8A. At step 1102, the audio/video content 906 is downloaded to the media player 920 for presentation via the display module 918, such as a desktop or portable device, and the advertising engine 914 downloads a set of advertising content to the placement agent 924. At step 1104, the media player 920 starts playback of the audio/video content from the media file/stream.

At step 1106, the advertising engine 914 tracks the playback status using the enhanced metadata 908 or data map 904 and playback status indicators received from the placement agent 924 (e.g. playback timing offsets). The playback status indicators received from the placement agent 924 can be determined by polling the media player 920 for the playback status information, including the identity of the media file/stream and current playback timing offset. Alternatively, the playback status indicators received from the placement agent 924 can be determined by the agent keeping track of the identity of the media file in playback and maintaining a playback clock that tracks the playback timing offset (e.g., in seconds). Using the playback status indicators from the placement agent 924, the advertising engine 914 then references either the enhanced metadata 908 or data map 904 to determine which of the content segments is currently in playback.

At step 1108, the advertising engine 914 continues to track the playback status until it detects a transition from a previous content segment (including no previous segment) to a current content segment. For example, with respect to FIG. 7B, a segment transition is detected when the playback timing offset crosses timing offset $T_{10}$ which divides the Red Sox story segment 902j and the New England Patriots story segment 902k. In particular, the playback offset is compared with the timing information of the enhanced metadata 908 or data map 904 to determine which of the content segments is presently in playback. At step 1010, once a segment transition has been detected, the advertising engine 914 references the data map 904 of FIG. 7C to determine the next set of advertising content to present based on the identifier of the current content segment in playback.

At step 1112, the advertising engine downloads the advertising content identifiers 904d, 904e, 904f determined from the data map 904 of FIG. 7C that correspond to the next set of advertising content to the placement agent 924.

At step 1114, the placement agent 924 uses the advertising content identifiers 904d, 904e, and 904f to select the corresponding advertising content from the available set of advertising content previously downloaded. The placement agent 924 then loads the selected advertising content into corresponding display objects 922 (e.g., windows, frames, scrolling text, etc.) of the display module 918 for presentation.

While this invention has been particularly shown and described with references to preferred embodiments thereof, it will be understood by those skilled in the art that various changes in form and details may be made therein without departing from the scope of the invention encompassed by the appended claims.

What is claimed:

1. A computer-implemented method for placement of advertising content within a playback stream, the method comprising
    receiving a segment list of timed content segments chosen from a set of discrete media files;
    obtaining enhanced metadata documents for the timed content segments, the enhanced metadata documents identifying timing information defined by timing boundaries of the timed content segments and at least one segment identifier associated with the timed content segments;
    identifying, using a relevancy engine, at least one relevant segment identifier from the at least one segment identifier for each of the timed content segments;
    associating the at least one relevant segment identifier to advertising content identifiers stored in a repository of a data map, the advertising content identifiers being mapped to specific advertising content;
    detecting segment transitions between each of the timed content segments; and
    presenting the specific advertising content that relates to each of the timed content segments at or near a time when the timed content segment is being played back.

2. The computer-implemented method of claim 1 wherein the segment identifier has a start offset and an end offset.

3. The computer-implemented method of claim 1 wherein the segment identifier is a word segment.

4. The computer-implemented method of claim 1 wherein the advertising content is stored in a data repository.

5. The computer-implemented method of claim 1 wherein the advertising content is in the form of audio, video, text, graphics and combinations thereof.

6. The computer-implemented method of claim 1 wherein the relevancy engine compares the at least one segment identifier against a predetermined set of key words.

7. The computer-implemented method of claim 1 wherein the relevancy engine interfaces with an advertising engine to generate the data map.

8. The computer-implemented method of claim 7 wherein a placement agent requests via the advertising engine a next set of advertising content to present via a display module.

9. The computer-implemented method of claim 1 wherein a placement agent is used for timed placement of the specific advertising content.

10. The computer-implemented method of claim 1 wherein a placement agent keeps track of a playback status for the segment list.

11. The computer-implemented method of claim 1 wherein a placement agent detects the segment transitions between each of the timed content segments.

12. A computerized apparatus for placement of advertising content within a playback stream comprising:
    a media player programmed to receive a segment list of timed content segments chosen from a set of discrete media files and to obtain enhanced metadata documents for the timed content segments, the enhanced metadata documents identifying timing information defined by timing boundaries of the timed content segments and at least one segment identifier associated with the timed content segments;

a relevancy engine implemented using a programmed processor and programmed to identify at least one relevant segment identifier from the at least one segment identifier for each of the timed content segments;

an advertising engine implemented using a programmed processor and programmed to associate the at least one relevant segment identifier to advertising content identifiers stored in a repository of a data map, the advertising content identifiers being mapped to specific advertising content; and a placement agent implemented using a programmed processor and programmed to detect segment transitions between each of the timed content segments and present the specific advertising content that relates to each of the timed content segments at or near a time when the timed content segment is being played back by the media player.

13. The computerized apparatus of claim 12 wherein the segment identifier has a start offset and an end offset.

14. The computerized apparatus of claim 12 wherein the segment identifier is a word segment.

15. The computerized apparatus of claim 12 wherein the advertising content is stored in a data repository.

16. The computerized apparatus of claim 12 wherein the advertising content is in the form of audio, video, text, graphics and combinations thereof.

17. The computerized apparatus of claim 12 wherein the relevancy engine compares the at least one segment identifier against a predetermined set of key words.

18. The computerized apparatus of claim 12 wherein the placement agent keeps track of a playback status for the segment list.

19. The computerized apparatus of claim 12 wherein the placement agent detects the segment transitions between each of the timed content segments.

20. The computerized apparatus of claim 12 wherein the placement agent requests via the advertising engine a next set of advertising content to present via a display module.

* * * * *